US009667454B1

(12) United States Patent
Koba et al.

(10) Patent No.: US 9,667,454 B1
(45) Date of Patent: May 30, 2017

(54) ADAPTIVE EQUALIZER

(71) Applicant: Hitachi, Ltd., Chiyoda-ku, Tokyo (JP)

(72) Inventors: Hideki Koba, Tokyo (JP); Keiki Watanabe, Tokyo (JP); Fumio Yuki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/186,791

(22) Filed: Jun. 20, 2016

(51) Int. Cl.
H04L 25/03 (2006.01)
(52) U.S. Cl.
CPC .............................. H04L 25/03063 (2013.01)
(58) Field of Classification Search
CPC .................................................. H04L 25/03063
See application file for complete search history.

(56) References Cited

U.S. PATENT DOCUMENTS

| | | | | |
|---|---|---|---|---|
| 8,301,036 | B2* | 10/2012 | He | H04L 25/03019 375/232 |
| 8,917,762 | B2* | 12/2014 | Francese | H04L 25/03146 375/233 |
| 2009/0304066 | A1* | 12/2009 | Chmelar | H03M 1/002 375/233 |
| 2014/0024327 | A1* | 1/2014 | Parikh | H04L 25/03057 455/226.1 |
| 2014/0177699 | A1* | 6/2014 | Tan | H04L 25/03057 375/233 |
| 2014/0362899 | A1* | 12/2014 | Nakao | H04L 27/01 375/232 |
| 2016/0191276 | A1* | 6/2016 | Sakai | H04L 27/02 375/233 |
| 2017/0005841 | A1* | 1/2017 | Komori | H04L 25/03949 |

FOREIGN PATENT DOCUMENTS

JP 2011-151765 A 8/2011

* cited by examiner

Primary Examiner — Kenneth Lam
(74) Attorney, Agent, or Firm — Crowell & Moring LLP

(57) ABSTRACT

An adaptive equalizer includes: a speculative equalization circuit which operates a plurality of first tap coefficients with respect to input data and selects operation data corresponding to the input data from a plurality of operation data obtained by the operation; and an adaptive equalization circuit which generates the plurality of first tap coefficients, on the basis of the input data. The adaptive equalization circuit includes: an operation circuit which selects one of a plurality of second tap coefficients corresponding to the plurality of first tap coefficients and operates the selected second tap coefficient with respect to the input data; and a tap coefficient generation circuit which generates the plurality of first tap coefficients, on the basis of operation data obtained by the operation of the operation circuit, when the second tap coefficient selected at the time of the operation in the operation circuit corresponds to the first tap coefficient used for the operation of the operation data selected in the speculative equalization circuit.

8 Claims, 7 Drawing Sheets

ADAPTIVE EQUALIZER

BACKGROUND OF THE INVENTION

1. Field of the Invention

The present invention relates to an adaptive equalizer and more particularly, to an adaptive equalizer including a speculative decision feedback equalization circuit.

2. Description of the Related Art

According to speeding up of an information communication apparatus, a transfer rate (data rate) of data transferred between semiconductor devices configuring the information communication apparatus increases. For example, it is predicted that a transfer rate per channel transferring data reaches 25 Gbps in 2016 and the transfer rate becomes faster. The semiconductor device is mounted on a substrate such as a printed substrate and data is transmitted and received via a wiring line of the substrate. In this case, the wiring line of the substrate functions as a transmission line to transmit data. However, there is transmission loss in the transmission line. For this reason, when the transfer rate of the data transmitted by the transmission line increases, the transmission loss also increases.

When data is transferred at a high transfer rate using the transmission line, inter-symbol interference occurs due to the transmission loss and the reflection in the transmission line and a waveform of the data is deteriorated. Particularly, if the transmission line is provided over a long distance, deterioration of the waveform of the data increases and it becomes difficult to transfer the data at the high transfer rate.

As technology for reducing the deterioration of the waveform due to the inter-symbol interference, equalizers are known. As the equalizers, there are multiple types of equalizers including an adaptive equalizer. If the equalizer is used, the inter-symbol interference can be suppressed and the data can be transferred at the high transfer rate in the transmission line of the long distance or the transmission line with the reflection. JP-2011-151765-A discloses technology for a decision feedback equalizer as the equalizer.

SUMMARY OF THE INVENTION

In the decision feedback equalizer, a signal to compensate for an influence of the inter-symbol interference is added to an input signal to be input data. In this case, a compensation amount is determined by a tap coefficient operated with respect to a symbol received in the past. For this reason, it is necessary to determine a value of the tap coefficient appropriately to reduce the deterioration caused by the inter-symbol interference.

In various transmission lines, to enable the deterioration caused by the inter-symbol interference to be reduced, the number of compensation signals added to an input signal is increased by increasing the number of tap coefficients. For example, a decision feedback equalizer corresponding to a data transfer rate of 5 Gbps is developed using 15 tap coefficients and a decision feedback equalizer corresponding to a data transfer rate of 28 Gbps is developed using 36 tap coefficients.

If the number of tap coefficients increases, it becomes difficult to acquire an appropriate value for each tap coefficient manually. For this reason, it is thought that an appropriate value of each tap coefficient is acquired using an adaptive equalizer and the acquired tap coefficient is used as the tap coefficient in the decision feedback equalizer. In this case, the tap coefficients used in the decision feedback equalizer converge in the adaptive equalizer.

In this configuration, the adaptive equalizer is coupled to a reception amplifier after the transmission line in many cases to monitor an input signal to be input data. For this reason, the decision feedback equalizer and the adaptive equalizer are coupled to an output of the reception amplifier, so that an output load capacity of the reception amplifier increases. When data is transferred at a high transfer rate, it is desirable to reduce the output load capacity of the reception amplifier.

In JP-2011-151765-A, the technology for the decision feedback equalizer is disclosed, but technology for suppressing the output load capacity of the reception amplifier from increasing is not disclosed.

Accordingly, an object of the present invention is to provide an adaptive equalizer that can suppress an output load capacity of a reception amplifier from increasing.

The above and other objects and novel characteristics of the invention will become apparent from the following description of specification with reference to the accompanying drawings.

An outline of a representative invention among inventions disclosed in the present application is simply described as follows.

An aspect of the present invention provides an adaptive equalizer including a speculative decision feedback equalization circuit and an adaptive equalization circuit each of which input data is supplied to. The speculative decision feedback equalization circuit operates a plurality of first tap coefficients with respect to the input data and selects operation data corresponding to the input data from a plurality of operation data obtained by the operation. The adaptive equalization circuit includes an operation circuit which selects one of a plurality of second tap coefficients corresponding to the plurality of first tap coefficients and operates the selected second tap coefficient with respect to the input data and a tap coefficient generation circuit which generates the plurality of first tap coefficients, on the basis of operation data obtained by the operation of the operation circuit, when the second tap coefficient selected at the time of the operation in the operation circuit corresponds to the first tap coefficient used for the operation of the operation data selected in the speculative decision feedback equalization circuit.

The present inventors have thought that input data deteriorated by inter-symbol interference caused by a transmission line is restored to original data by a speculative decision feedback equalization circuit (hereinafter, also referred to as the speculative equalization circuit), before the present invention. At this time, the present inventors have thought that a tap coefficient used in the speculative equalization circuit is acquired by an adaptive equalization circuit, not manually. In this case, the adaptive equalizer to equalize the deteriorated input data includes the speculative equalization circuit and the adaptive equalization circuit. FIG. 7 is a block diagram illustrating a configuration of the adaptive equalizer examined by the present inventors before the present invention. In FIG. 7, only a portion necessary for description in the configuration of the adaptive equalizer examined is illustrated. A problem of the adaptive equalizer examined previously is described using FIG. 7.

In FIG. 7, EQ shows the adaptive equalizer. In FIG. 7, only a portion corresponding to one channel of the adaptive equalizer EQ is illustrated. In FIG. 7, RX_PAD(1) shows an external terminal connected to a transmission line not illustrated in the drawings and data transmitted by the transmission line is supplied (input) as input data RXI(1) to the external terminal RX_PAD(1). In addition, the input data RXI(1) is input as RXO(1) to a terminal TRX(1) after passing through a reception amplifier RCV(1). In FIG. 7, DFE shows the speculative equalization circuit and AEQ shows the adaptive equalization circuit. The terminal TRX (1) is coupled to the speculative equalization circuit DFE and the adaptive equalization circuit AEQ and the input data RXO(1) supplied to the terminal TRX(1) is supplied to the speculative equalization circuit DFE and the adaptive equalization circuit AEQ.

The speculative equalization circuit DFE includes latch circuits DL(1) to DL(5) that are connected in series. Here, an input of the latch circuit DL(1) of an initial step is connected to the terminal TRX(1), an output of the latch circuit DL(1) is connected to an input terminal D of the latch circuit DL(2) of a second step, and an output terminal Q of the latch circuit DL(2) is connected to an input terminal D of the latch circuit DL(3) of a third step. In addition, an output terminal Q of the latch circuit DL(3) is connected to an input terminal D of the latch circuit DL(4) of a fourth step and an output terminal Q of the latch circuit DL(4) is connected to an input terminal D of the latch circuit DL(5) of a fifth step.

In a configuration illustrated in FIG. 7, output data RRS(1) obtained by reducing deterioration caused by inter-symbol interference from the data RXO(1) after passing through the reception amplifier RCV(1) is output from the output terminal Q of the latch circuit DL(5). That is, the deterioration by the inter-symbol interference occurred in the transmission line is removed from RXO(1) to be a signal when the input data RXI(1) deteriorated by the transmission line has passed through the reception amplifier RCV(1) and data similar to the input data at the time of being supplied to the transmission line is output as the output data RRS(1) from the output terminal Q of the latch circuit DL(5).

Each of the latch circuits DL(2) to DL(5) is configured using a flip-flop circuit and takes data supplied to the input terminal D in synchronization with rising of a clock signal CLK1 supplied to a clock terminal CK and outputs the data from the output terminal Q.

The latch circuit DL(1) of the initial step includes operation circuits DOP1 and DOP2, tap coefficient storage circuits DTC1 and DTC2, latch circuits DLH1 and DLH2, and a selector DSEL.

A tap coefficient +TAP1 is stored in the tap coefficient storage circuit DTC1 and a tap coefficient −TAP1 is stored in the tap coefficient storage circuit DTC2. Here, the tap coefficient +TAP1 represents an offset value of the side of a first direction (+ direction) with respect to a reference and the tap coefficient −TAP1 represents an offset value of the side of a second direction (− direction) opposite to the first direction with respect to the reference.

The operation circuit DOP1 is connected to the terminal TRX(1) and the tap coefficient storage circuit DTC1 and executes an operation between the input data RXO(1) supplied to the terminal TRX(1) and the tap coefficient +TAP1. Operation data obtained by the operation is supplied to an input terminal D of the latch circuit DLH1. Likewise, the operation circuit DOP2 is connected to the terminal TRX(1) and the tap coefficient storage circuit DTC2 and executes an operation between the input data RXO(1) supplied to the terminal TRX(1) and the tap coefficient −TAP1. Operation data obtained by the operation is supplied to an input terminal D of the latch circuit DLH2.

The operation is executed between the input data RXO(1) and the tap coefficient +TAP1 by the operation circuit DOP1, the offset value of the + direction is added to the input data RXO(1), and the input data RXO(1) to which the offset value of the + direction has been added is supplied as operation data to the latch circuit DLH1. Likewise, the operation is executed between the input data RXO(1) and the tap coefficient −TAP1 by the operation circuit DOP2, the offset value of the − direction is added to the input data RXO(1), and the input data RXO(1) to which the offset value of the − direction has been added is supplied as operation data to the latch circuit DLH2.

Each of the latch circuits DLH1 and DLH2 takes the operation data supplied to the input terminal D when a clock signal CLK1 supplied to a clock terminal CK rises, holds the operation data, and outputs the operation data from an output terminal Q. The output terminal Q of the latch circuit DLH1 is connected to a first input terminal I1 of the selector DSEL and the output terminal Q of the latch circuit DLH2 is connected to a second input terminal I2 of the selector DSEL. The selector DSEL outputs operation data supplied to the first input terminal I1 or operation data supplied to the second input terminal I2 from an output terminal Q, according to a logical value supplied to a selection terminal SEL. The output terminal Q of the selector DSEL functions as the output terminal of the latch circuit DL(1) of the initial step and inputs of the operation circuits DOP1 and DOP2 function as the input terminal of the latch circuit DL(1) of the initial step.

Output data of the latch circuit DL(2) of the second step is supplied as a selection signal to the selection terminal SEL of the selector DSEL.

The input data RXO(1) is sequentially shifted to the latch circuits DL(1) to DL(5) in synchronization with rising of the clock signal CLK1. For this reason, the selector DSEL in the latch circuit DL(1) of the initial step selects operation data, according to output data of the latch circuit DL(2) corresponding to the input data RXO(1) input in the past. In an example of FIG. 7, the operation data is selected by data of one cycle (UI) of the clock signal CLK1. As a result, the operation data to which the offset value of the + direction has been added or the operation data to which the offset value of the − direction has been added is output from the latch circuit DL(1) of the initial step, according to a logical value of the past input data RXO(1), and the deterioration by the inter-symbol interference can be reduced.

As such, in the speculative equalization circuit DFE, after the operations between the input data RXO(1) and the tap coefficients +TAP1 and −TAP1 are executed speculatively and the operation data corresponding to each tap coefficient is generated, appropriate operation data is selected on the basis of the logical value of the past input data RXO(1) and is output as the output data RRS(1). Because a plurality of operation data are acquired speculatively, the operations between the input data RXO(1) and the tap coefficients +TAP1 and −TAP1 may be executed before two cycles (2UI) to generate the selection signal for the selector DSEL. For this reason, the operation circuits DOP1 and DOP2 can be easily designed. For example, high-speed operation circuits may not be designed as the operation circuits DOP1 and DOP2.

The adaptive equalization circuit AEQ includes a latch circuit ALE having the same configuration as the latch circuit DL(1) of the initial step described above and a tap coefficient generation circuit TPG. That is, the latch circuit ALE includes operation circuits AOP1 and AOP2, tap coefficient storage circuits ATC1 and ATC2, latch circuits ALH1 and ALH2, and a selector ASEL. Here, the operation circuits AOP1 and AOP2 correspond to the operation circuits DOP1 and DOP2, the tap coefficient storage circuits ATC1 and ATC2 correspond to the tap coefficient storage circuits DTC1 and DTC2, and the latch circuits ALH1 and ALH2 correspond to the latch circuits DLH1 and DLH2. In addition, the selector ASEL corresponds to the selector DSEL and a signal output from the latch circuit DL(2) of the second step is supplied as a selection signal to a selection terminal SEL of the selector ASEL. Because an operation of the latch circuit ALE is the same as the operation of the latch circuit DL(1), description thereof is omitted.

The tap coefficient generation circuit TPG generates the tap coefficients +TAP1 and −TAP1 stored in the tap coefficient storage circuits DTC1, DTC2, ATC1, and ATC2, on the basis of operation data from the selector ASEL in the latch circuit ALE. As a result, the tap coefficients +TAP1 and −TAP1 used in the speculative equalization circuit DFE and the adaptive equalization circuit AEQ can be acquired by the adaptive equalization circuit AEQ, not manually. The latch circuit ALE operates in synchronization with a clock signal CLK2 and the tap coefficient generation circuit TPG operates in synchronization with a clock signal CLK3.

However, in this case, the operation circuits DOP1 and DOP2 provided in the latch circuit DL(1) and the operation circuits AOP1 and AOP2 provided in the latch circuit ALE are connected to the terminal TRX(1). For this reason, a load capacity associated with the terminal TRX(1) may be twice as much as a load capacity of the speculative equalization circuit. The terminal TRX(1) is connected to an output of the reception amplifier. As a result, a load capacity connected to the output of the reception amplifier increases. When the output load capacity of the reception amplifier increases, this restricts improvement of the transfer rate. In addition, because the latch circuit ALE used in the adaptive equalization circuit AEQ has the same configuration as the configuration of the latch circuit DL(1), consumption power of a latch circuit DL of an initial step becomes doubled and an occupation area also becomes doubled.

Meanwhile, according to one aspect, as described above, the adaptive equalization circuit includes an operation circuit which selects one of a plurality of tap coefficients (second tap coefficients) and operates the selected tap coefficient with respect to input data and a tap coefficient generation circuit which generates the plurality of tap coefficients (first tap coefficients), on the basis of operation data obtained by the operation of the operation circuit, when the tap coefficient selected at the time of the operation in the operation circuit corresponds to a tap coefficient (first tap coefficient) used for an operation of operation data selected in the speculative equalization circuit. Thereby, operation circuits in the adaptive equalization circuit can be reduced. As a result, the load capacity connected to the output of the reception amplifier can be suppressed from increasing. In addition, the consumption power and the occupation area can be suppressed from increasing.

An effect obtained by the representative invention among the inventions disclosed in the present application is simply described as follows.

The present invention can provide an adaptive equalizer that can suppress an output load capacity of a reception amplifier from increasing.

DESCRIPTION OF THE PREFERRED EMBODIMENTS

Figure 1:
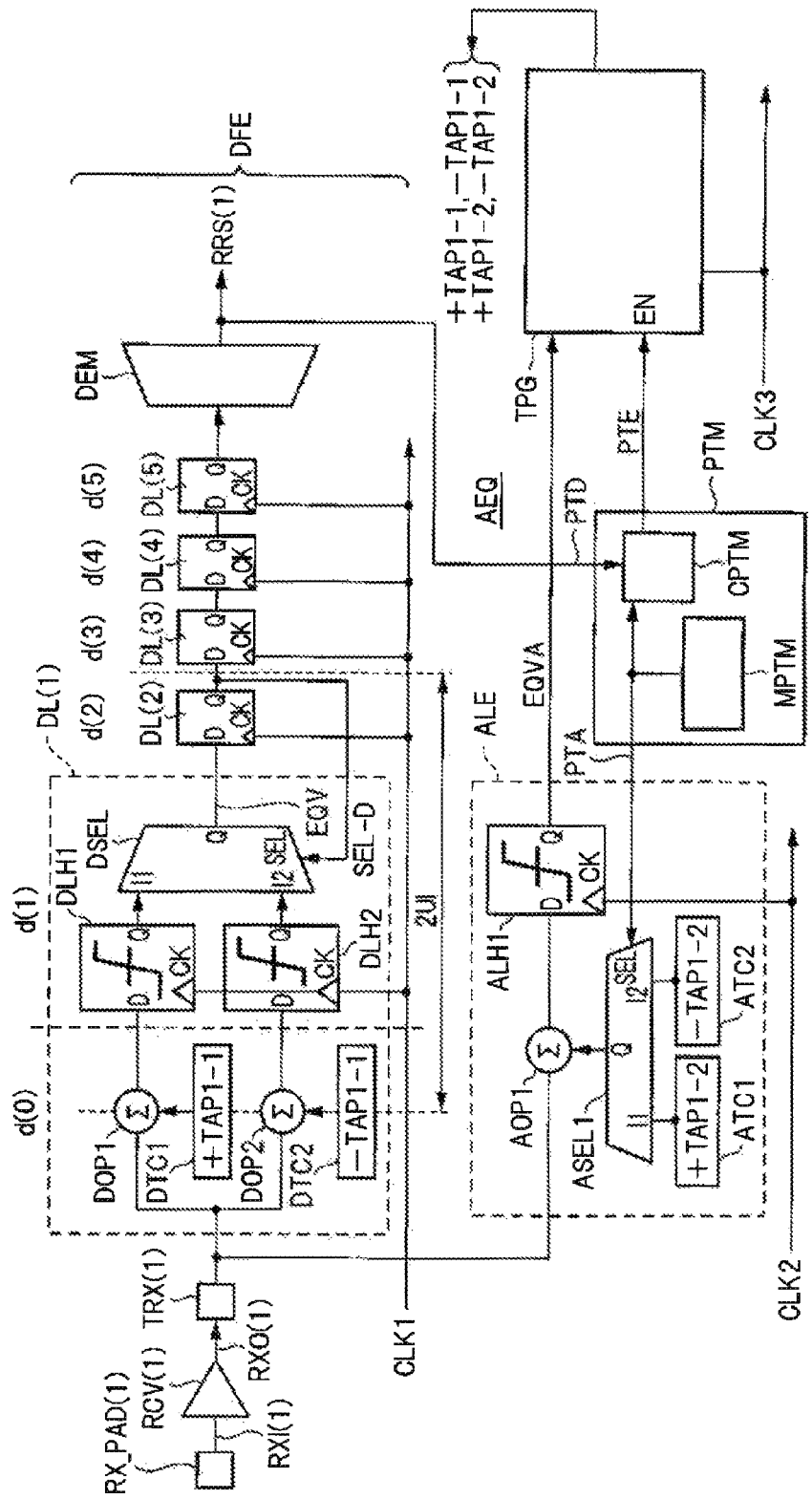
FIG. 1 is a block diagram illustrating a configuration of an adaptive equalizer according to a first embodiment.

Preferred embodiments of the present invention will be described in detail below with reference to the accompanying drawings, wherein like reference numerals refer to like parts throughout, and the repeated description thereof is omitted.

First Embodiment

<Configuration of Electronic Apparatus>

Figure 5:
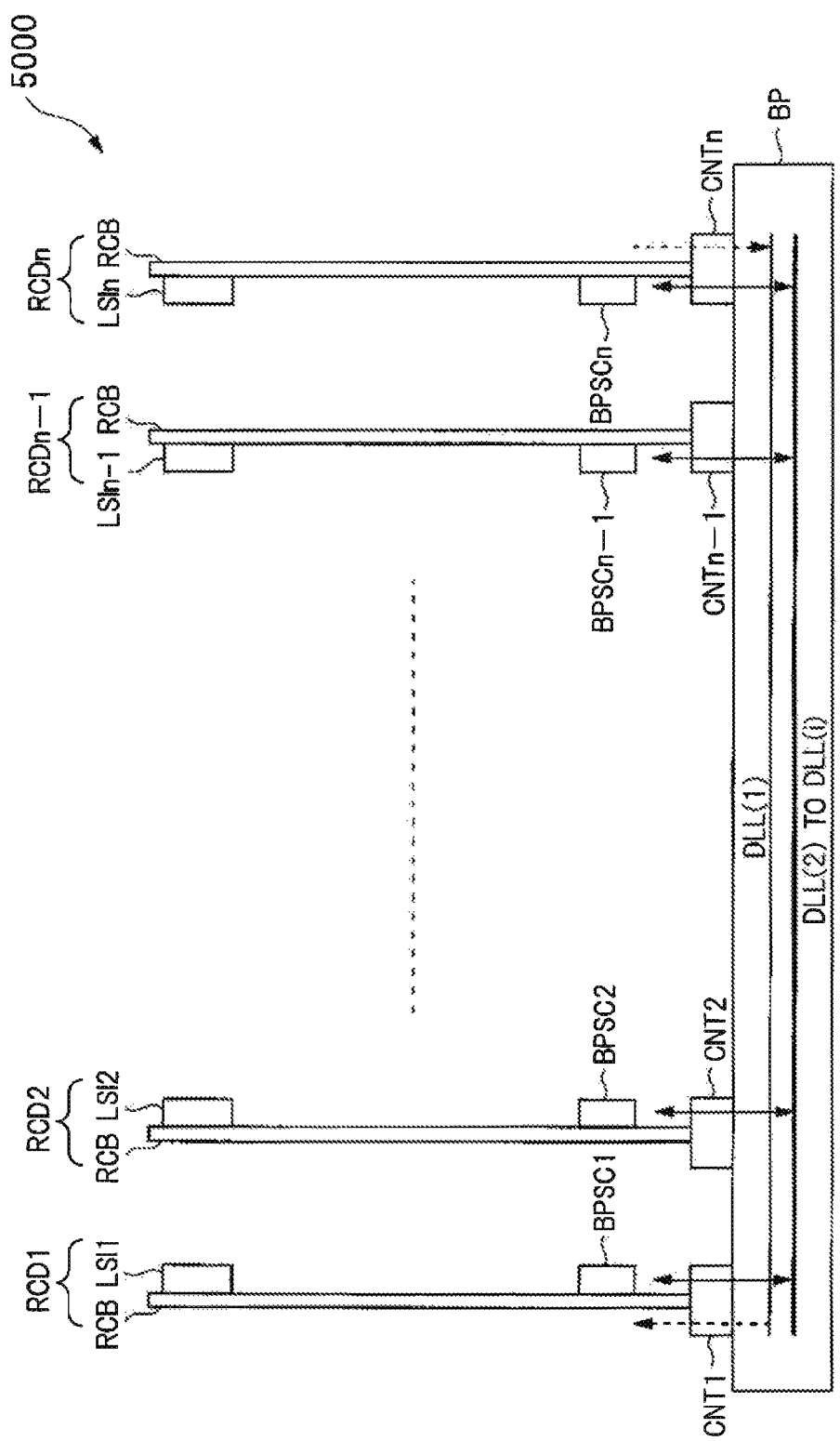
FIG. 5 is a cross-sectional view illustrating a configuration of an information communication apparatus according to the first embodiment.

FIG. 5 is a schematic cross-sectional view illustrating a configuration of an electronic apparatus using an adaptive equalizer according to a first embodiment. In FIG. 5, 5000 shows an information communication apparatus to be the electronic apparatus. Although not limited in particular, the information communication apparatus 5000 includes a backplane BP that has a plurality of connectors CNT1 to CNTn mounted thereon and cards RCD1 to RCDn that are mounted on the connectors CNT1 to CNTn.

The backplane BP is provided with a plurality of wiring lines to electrically connect the connectors CNT1 to CNTn and the wiring lines become transmission lines when data is transmitted between the connectors CNT1 to CNTn. In FIG. 5, the transmission lines configured using the wiring lines formed in the backplane BP are shown as DLL(1) to DLL(i). In addition, the transmission line used when data is transmitted between the connectors CNT1 and CNTn is shown as DLL(1) and the remaining transmission lines DLL(2) to DLL(i) are shown by one thick solid line, for the convenience of description.

Each of the cards RCD1 to RCDn includes a substrate RCB and a plurality of semiconductor devices and a plurality of electronic elements mounted on the substrate RCB and the plurality of semiconductor devices and the plurality of electronic elements or/and the plurality of semiconductor devices (including the electronic elements) and the connectors are electrically connected by wiring lines formed in the substrate RCB. Because a part of the wiring lines formed in the substrate RCB is also used for data transmission, the partial wiring lines function as the transmission lines. In FIG. 5, among the cards RCD1 to RCDn, the cards RCD1, RCD2, RCDn−1, and RCDn are exemplified.

If the cards illustrated in FIG. 5 are exemplified, the plurality of semiconductor devices are mounted on the card RCD1. However, in FIG. 5, only two semiconductor devices LSI1 and BPSC1 are illustrated as the semiconductor devices. Here, the semiconductor device BPSC1 shows a semiconductor device that has a function of a signal conditioner. The function of the signal conditioner is a function of, when data is supplied via the transmission lines DLL(1) to DLL(i) configured using the wiring lines formed in the substrate RCB, equalizing deterioration of the data by inter-symbol interference caused by the transmission lines and supplying the data restored by equalization to the semiconductor device LSI1. Similar to the card RCD1, a plurality of semiconductor devices are mounted on each of the cards RCD2, RCDn−1, and RCDn. When the card RCD2 is viewed, a semiconductor device LSI2 and a semiconductor device BPSC2 having the function of the signal conditioner among the plurality of semiconductor devices mounted are illustrated and when the card RCDn−1 is viewed, a semiconductor device LSIn−1 and a semiconductor device BPSCn−1 having the function of the signal conditioner among the plurality of semiconductor devices mounted are illustrated. Likewise, when the card RCDn is viewed, a semiconductor device LSIn and a semiconductor device BPSCn having the function of the signal conditioner among the plurality of semiconductor devices mounted are illustrated. The function of the signal conditioner in each of the semiconductor devices BPSC2, BPSCn−1, and BPSCn is the same as the function of the signal conditioner in the semiconductor device BPSC1.

In the transmission line DLL(1) illustrated in FIG. 5, as shown by a dashed arrow, for example, data is supplied from the card RCDn via the connector CNTn. The data is transmitted by the transmission line DLL(1) and the transmitted data is supplied to the semiconductor device BPSC1 mounted on the card RCD1 via the connector CNT1, as shown by a dashed arrow. The data restored in the semiconductor device BPSC1 is supplied to the semiconductor device (for example, LSI1) mounted on the card RCD1 and is processed in the semiconductor device LSI1. The data supplied from the card RCDn to the transmission line DLL(1) is generated by the semiconductor device LSIn, for example. A device to generate the data is not limited to the semiconductor device and may be an optical module mounted on the card RCDn, for example.

<Semiconductor Device Having Function of Signal Conditioner>

Figure 6:
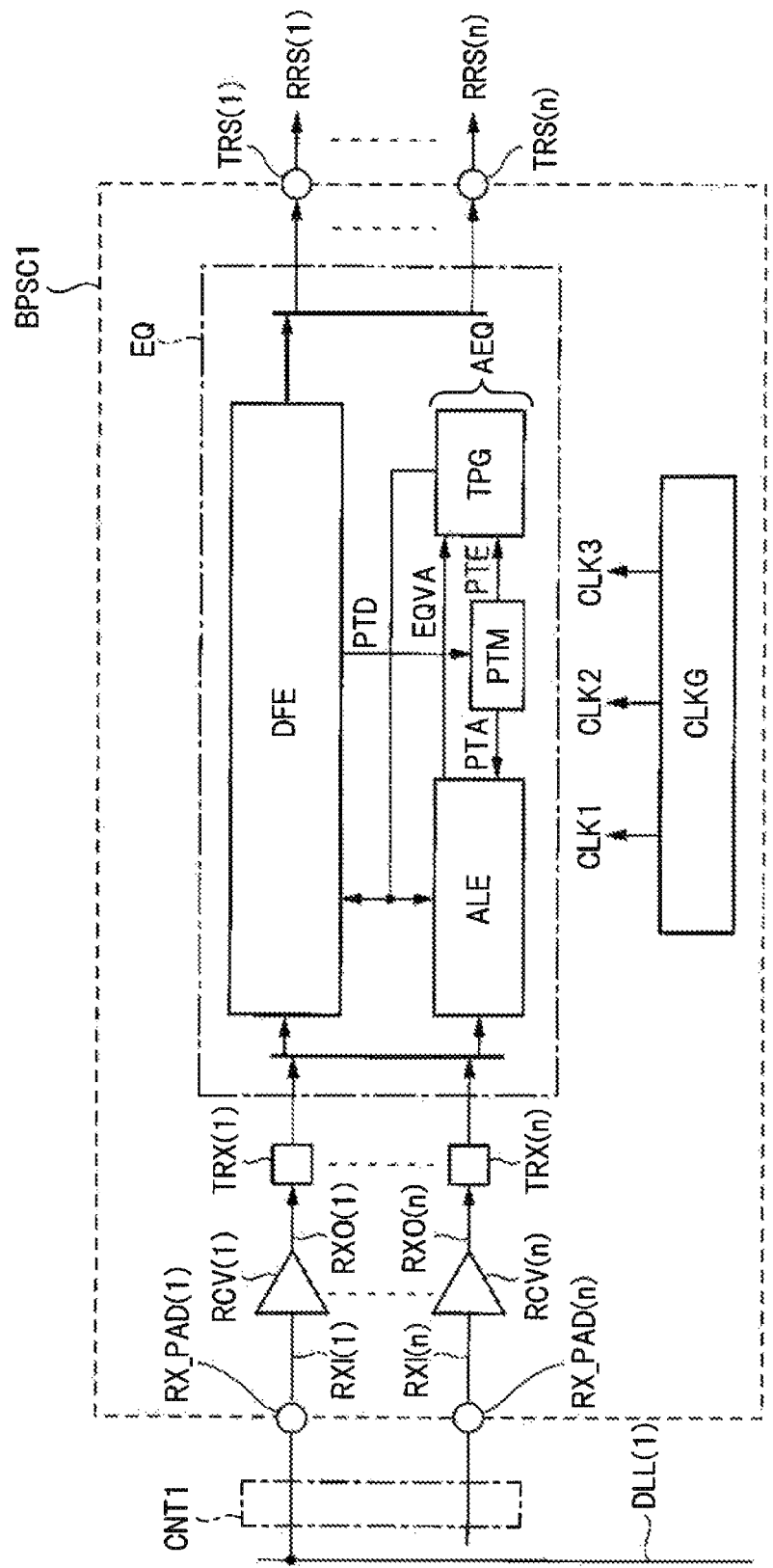
FIG. 6 is a block diagram illustrating a configuration of a semiconductor device according to the first embodiment.

FIG. 6 is a block diagram illustrating a configuration of the semiconductor device having the function of the signal conditioner. Here, the semiconductor device BPSC1 illustrated in FIG. 6 is exemplified. However, the other semiconductor devices BPSC2 to BPSCn have also the same configuration. In FIG. 6, BPSC1 is the semiconductor device that is manufactured using known semiconductor technology and has the function of the signal conditioner. The semiconductor device BPSC1 illustrated in FIG. 6 has the function of the signal conditioner corresponding to the transmission lines of the n channels. That is, input data RXI(1) to RXI(n) are supplied via the n transmission lines, respectively, and restored n output data RRS(1) to RRS(n) are output to the semiconductor device LSI1 (refer to FIG. 5), for example. Logic circuits to process data or transmission circuits to output the output data RRS(1) to RRS(n) may be inserted between an adaptive equalizer EQ and external terminals TRS(1) to TRS(n).

The semiconductor device BPSC1 includes a plurality of external terminals. However, in FIG. 6, among the plurality of external terminals, only external terminals RX_PAD(1) to RX_PAD(n) to which the input data RXI(1) to RXI(n) are supplied and the external terminals TRS(1) to TRS(n) to output the output data RRS(1) to RRS(n) are illustrated. In addition, in FIG. 6, only a circuit block regarding the function of the signal conditioner is illustrated to simplify the drawing.

In FIG. 6, a block CNT1 surrounded by a dashed line shows the connector CNT1 illustrated in FIG. 5. The external terminals RX_PAD(1) to RX_PAD(n) are connected to the transmission lines formed in the backplane BP via the connector CNT1. For example, FIG. 6 illustrates a state in which the external terminal RX_PAD(1) corresponding to a channel 1 is connected to the transmission line DLL(1) illustrated in FIG. 5 via the connector CNT1.

The semiconductor device BPSC1 includes reception amplifies RCV(1) to RCV(n), an adaptive equalizer EQ, and a block signal generation circuit CLKG. The clock signal generation circuit CLKG generates clock signals CLK1, CLK2, and CLK3 to operate the adaptive equalizer EQ. In FIG. 6, the clock signal generation circuit CLKG is illustrated as a circuit block different from the adaptive equalizer EQ. However, because the clock signals generated by the clock signal generation circuit CLKG are supplied to the adaptive equalizer EQ, the clock signal generation circuit CLKG may be included in the adaptive equalizer EQ. When the semiconductor device BPSC1 has only the function of the signal conditioner, the semiconductor device BPSC1 can be regarded as the adaptive equalizer.

The adaptive equalizer EQ includes a speculative equalization circuit DFE and an adaptive equalization circuit AEQ. In addition, the adaptive equalization circuit AEQ includes a latch circuit (operation circuit) ALE, a pattern match determination circuit PTM, and a tap coefficient generation circuit TPG. The speculative equalization circuit DFE and the adaptive equalization circuit AEQ are connected to terminals TRX(1) to TRX(n) and input data transmitted from the external terminals RX_PAD(1) to RX_PAD(n) by the transmission lines pass through the reception amplifiers RCV(1) to RCV(n) and are supplied as RXO(1) to RXO(n). That is, the input data in each channel is supplied to the speculative equalization circuit DFE and the adaptive equalization circuit AEQ.

In the adaptive equalization circuit AEQ, the latch circuit ALE executes an operation between the input data of each channel and a tap coefficient selected from a plurality of tap coefficients and supplies operation data EQVA obtained by the operation to the tap coefficient generation circuit TPG.

The pattern match determination circuit PTM generates a standby pattern PTA to select the tap coefficient from the plurality of tap coefficients in the latch circuit ALE. In addition, the pattern match determination circuit PTM compares a tap coefficient selection pattern PTD supplied from the speculative equalization circuit DFE and the standby pattern PTA and generates a tap coefficient generation enable signal PTE showing whether a comparison result is matching.

When the tap coefficient generation enable signal PTE shows matching, the tap coefficient generation circuit TPG updates (generates) a tap coefficient, on the basis of the operation data EQVA from the latch circuit ALE. Meanwhile, when the tap coefficient generation enable signal PTE shows mismatching, the tap coefficient generation circuit TPG discards the supplied operation data EQVA and does not update the tap coefficient.

Figure 7:
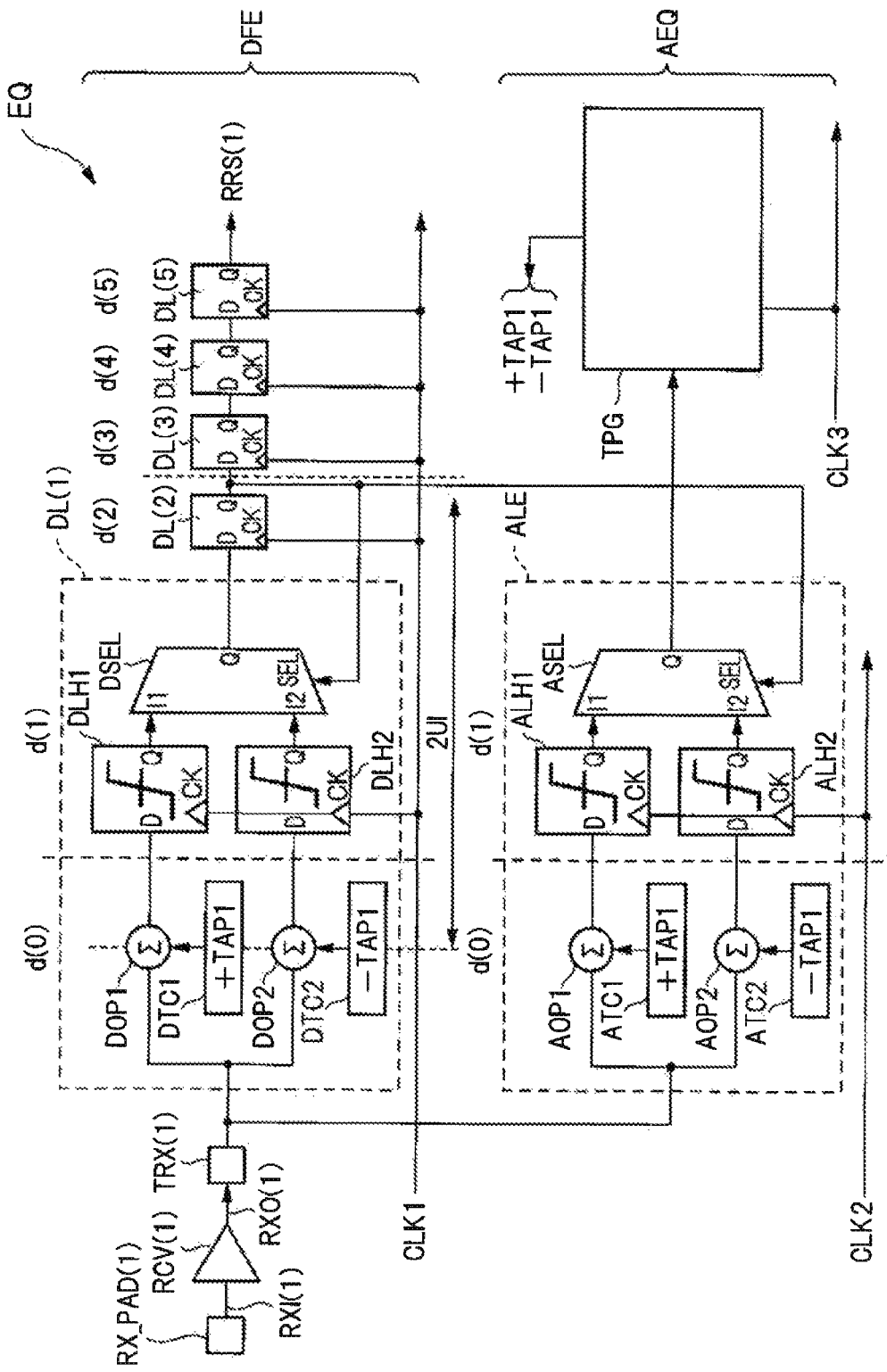
FIG. 7 is a block diagram illustrating a configuration of an adaptive equalizer.

The tap coefficient is supplied from the tap coefficient generation circuit TPG to the speculative equalization circuit DFE and the latch circuit ALE. In the speculative equalization circuit DFE, an operation is executed between the supplied tap coefficient and the input data and data obtained by equalization are supplied to the external terminals TRS (1) to TRS(n). The data supplied to the external terminals TRS(1) to TRS(n) become the output data RRS(1) to RRS(n) obtained by restoring the input data supplied to the individual channels. As described in FIG. 7, at the time of equalization, the speculative equalization circuit DFE executes an operation between the plurality of tap coefficients and the input data, generates a plurality of operation data speculatively, and selects appropriate operation data.

The tap coefficient selection pattern PTD is generated on the basis of the selection signal to select the operation data.

In the first embodiment, the speculative equalization circuit DFE operates in synchronization with a clock signal (first clock signal) CLK1 and the latch circuit ALE operates in synchronization with a clock signal (second clock signal) CLK2. In addition, the tap coefficient generation circuit TPG operates in synchronization with a clock signal (third clock signal) CLK3. Although not limited in particular, the pattern match determination circuit PTM operates in synchronization with the clock signal CLK2, similar to the latch circuit ALE.

Although not limited in particular, a frequency of the clock signal CLK1 is higher than a frequency of the clock signal CLK2.

In the latch circuit ALE, an operation is not executed between the plurality of tap coefficients and the input data and an operation is executed between the selected tap coefficient and the input data. For this reason, operation circuits in the latch circuit ALE can be reduced. As a result, the operation circuits connected to the terminals TRX(1) to TRX(n) can be suppressed from increasing. In addition, an occupation area can be suppressed from increasing and consumption power can be suppressed from increasing. Because the frequency of the clock signal CLK2 is lower than the frequency of the clock signal CLK1, the consumption power can be further suppressed from increasing.

<Configuration of Adaptive Equalizer>

Next, a configuration of the adaptive equalizer EQ illustrated in FIG. 6 will be described in detail. As described in FIG. 6, the adaptive equalizer EQ corresponds to the plurality of channels. However, a configuration corresponding to one channel is described herein to facilitate description. The remaining channels also have the same configuration.

FIG. 1 is a block diagram illustrating the configuration of the adaptive equalizer EQ according to the first embodiment. In FIG. 1, only a portion regarding the channel corresponding to the external terminal RX_PAD(1) in the adaptive equalizer EQ illustrated in FIG. 6 is illustrated.

<<Speculative Equalization Circuit>>

The speculative equalization circuit DFE includes latch circuits DL(1) to DL(5) and a demultiplexer DEM. A configuration of the latch circuits DL(1) to DL(5) is similar to the configuration illustrated in FIG. 7.

The latch circuits DL(1) to DL(5) are connected in series and the latch circuit DL(1) of an initial step includes operation circuits DOP1 and DOP2, tap coefficient storage circuits DTC1 and DTC2, latch circuits DLH1 and DLH2, and a selector DSEL. The operation circuit DOP1 is connected to the terminal TRX(1) and the tap coefficient storage circuit DTC1 and the operation circuit DOP2 is connected to the terminal TRX(1) and the tap coefficient storage circuit DTC2. The operation circuit DOP1 executes an operation between input data RXO(1) supplied from the terminal TRX(1) and a tap coefficient +TAP1-1 stored in the tap coefficient storage circuit DTC1 and supplies operation data obtained by the operation to an input terminal D of the latch circuit DLH1. Likewise, the operation circuit DOP2 executes an operation between the input data RXO(1) supplied from the terminal TRX(1) and a tap coefficient −TAP1-1 stored in the tap coefficient storage circuit DTC2 and supplies operation data obtained by the operation to an input terminal D of the latch circuit DLH2.

Each of the latch circuits DLH1 and DLH2 include an input terminal D, an output terminal Q, and a clock terminal CK. Each of the latch circuits DLH1 and DLH2 takes the operation data supplied to the input terminal D in synchronization with rising (rising from a low level to a high level) of the clock signal CLK1 supplied to the clock terminal CK and holds the operation data. Each of the latch circuits DLH1 and DLH2 outputs the held operation from each output terminal Q.

The output terminal Q of the latch circuit DLH1 is connected to a first input terminal I1 of the selector DSEL and the output terminal Q of the latch circuit DLH2 is connected to a second input terminal I2 of the selector DSEL. The selector DSEL selects operation data supplied to the first input terminal I1 or operation data supplied to the second input terminal I2 and outputs the selected operation data as operation data EQV from an output terminal Q, according to a logical value of a selection signal SEL-D supplied to a selection terminal SEL. The output terminal Q of the selector DSEL becomes the output terminal of the latch circuit DL(1) of the initial step and inputs of the operation circuits DOP1 and DOP2 become the input terminals of the latch circuit DL(1) of the initial step.

Each of the latch circuits DL(2) to DL(5) is configured using a flip-flop circuit. The flip-flop circuit configuring each of the latch circuits DL(2) to DL(5) includes an input terminal D, an output terminal Q, and a clock terminal CK and takes data supplied to the input terminal D in synchronization with rising of the clock signal CLK1 supplied to the clock terminal CK, holds the data, and outputs the data from the output terminal Q.

An input terminal D of the latch circuit DL(2) of a second step is connected to an output terminal of the latch circuit DL(1) of the initial step, an output terminal Q of the latch circuit DL(2) of the second step is connected to an input terminal D of the latch circuit DL(3) of a third step, and an output terminal Q of the latch circuit DL(3) of the third step is connected to an input terminal D of the latch circuit DL(4) of a fourth step. An input terminal D of the latch circuit DL(5) of a fifth step is connected to an output terminal of the latch circuit DL(4) of the fourth step and an output terminal Q of the latch circuit DL(5) of the fifth step is connected to an input of the demultiplexer DEM. In this way, the latch circuits DL(1) to DL(5) are connected in series between the terminal TRX(1) and the demultiplexer DEM.

The selection terminal SEL of the selector DSEL is connected to the output terminal Q of the latch circuit DL(2) of the second step. For this reason, the selector DSEL selects the operation data supplied to the first input terminal I1 or the second input terminal I2, according to a logical value of data output from the latch circuit DL(2) of the second step, and outputs the operation data.

Each of the latch circuits DLH1 and DLH2 and DL(2) to DL(5) takes the operation data supplied to the input terminal D in synchronization with rising of the clock signal CLK1. Here, when continuous cycles of the clock signal CLK1 are represented as d(0) to d(5), operation data acquired by the operation by the operation circuits DOP1 and DOP2 at a cycle d(0) is held in the latch circuits DLH1 and DLH2 at a next cycle d(1). At a next cycle d(2), the operation data held in the latch circuit DLH1 or the operation data held in the latch circuit DLH2 is taken in the latch circuit DL(2) and is held therein. At a next cycle d(3), the operation data held in the latch circuit DL(2) is taken in the latch circuit DL(3) and is held therein. In this way, one of the operation data acquired by the operation at the cycle d(0) is sequentially shifted to the latch circuits DL(2) to DL(5) and is supplied to the demultiplexer DEM.

The operation data stored in the latch circuit DLH1 and the operation data stored in the latch circuit DLH2 are selected by the output data (operation data) of the latch circuit DL(2) corresponding to the past input data. That is, the operation data stored in the latch circuit DLH1 or the operation data stored in the latch circuit DLH2 is selected by the operation data output from the latch circuit DL(2) by shifting the input data RXO(1) supplied to the latch circuit DL(1) in the past.

The tap coefficient +TAP1-1 represents an offset value of a + direction with respect to a reference and the tap coefficient −TAP1-1 represents an offset value of a − direction with respect to the reference. Operation data obtained by adding the offset value of the + direction to the input data RXO(1) is generated by the operation by the operation circuit DOP1 and operation data obtained by adding the offset value of the − direction to the input data RXO(1) is generated by the operation by the operation circuit DOP2. One operation data is selected from the speculatively obtained two operation data by the input data RXO(1) supplied in the past. As a result, the operation data obtained by adding the offset value to decrease deterioration to data deteriorated by the inter-symbol interference is taken in the latch circuit DL(2) and is held therein.

The operation data held in the latch circuit DL(2) is sequentially shifted to the latch circuits DL(3), DL(4), and DL(5) in synchronization with a change in the clock signal CLK1, is supplied to the demultiplexer DEM, and is output as data RRS(1) via the external terminal TRS(1). The data RRS(1) is supplied to the semiconductor device LSI1 mounted on the substrate RCB (refer to FIG. 5) of the card RCD1 (refer to FIG. 5). Because the deterioration of the input data RXI(1) deteriorated in the transmission line DLL(1) is reduced by the speculative equalization circuit DFE, data similar to data output from the semiconductor device LSIn of the card RCDn is supplied as the data RRS(1) to the semiconductor device LSI1. As a result, the information communication apparatus 5000 can be prevented from operating erroneously.

<<Adaptive Equalization Circuit>>

In the first embodiment, the latch circuit ALE includes an operation circuit AOP1, a selector ASEL1, tap coefficient storage circuits ATC1 and ATC2, and a latch circuit ALH1. The operation circuit AOP1 is connected to the terminal TRX(1) and an output terminal Q of the selector ASEL1. The tap coefficient storage circuit ATC1 is connected to a first input terminal I1 of the selector ASEL1 and the tap coefficient storage circuit ATC2 is connected to a second input terminal I2 of the selector ASEL1. In addition, a standby pattern PTA is supplied from the pattern match determination circuit PTM to the selection terminal SEL of the selector ASEL1.

Although not limited in particular, a tap coefficient +TAP1-2 of the + direction with respect to the reference is stored in the tap coefficient storage circuit ATC1 and a tap coefficient −TAP1-2 of the − direction with respect to the reference is stored in the tap coefficient storage circuit ATC2. The selector ASEL1 selects the tap coefficient +TAP1-2 supplied to the first input terminal I1 or the tap coefficient −TAP1-2 supplied to the second input terminal I2, according to a logical value of the standby pattern PTA, and supplies the selected tap coefficient to the operation circuit AOP1.

The operation circuit AOP1 executes an operation between the input data RXO(1) supplied to the terminal TRX(1) and the tap coefficient selected by the selector ASEL1. As described above, the tap coefficient +TAP1-2 represents an offset value of the + direction with respect to the reference and the tap coefficient −TAP1-2 represents an offset value of the − direction with respect to the reference.

When the tap coefficient +TAP1-2 is selected by the selector ASEL1, the offset value of the + direction (side) is added to the input data RXO(1) by the operation by the operation circuit AOP1 and operation data to which the offset value of the + side has been added is generated. In contrast, when the tap coefficient −TAP1-2 is selected by the selector ASEL1, the offset value of the − direction (side) is added to the input data RXO(1) by the operation by the operation circuit AOP1 and operation data to which the offset value of the − side has been added is generated.

The latch circuit ALH1 takes the operation data supplied to the input terminal D thereof, that is, the operation data generated by the operation circuit AOP1 in synchronization with rising of the clock signal CLK2 and holds the operation data. The held operation data is supplied as operation data EQVA to the tap coefficient generation circuit TPG. The operation data EQVA is the operation data to which the offset value of the + side has been added or the operation data to which the offset value of the − side has been added.

The pattern match determination circuit PTM includes a pattern generation circuit MPTM to generate a standby pattern PTA and a pattern comparison circuit CPTM. The pattern generation circuit MPTM generates a logical value pattern in which logical values "1" and "0" circulate temporally and outputs the logical value pattern as the standby pattern PTA. The pattern comparison circuit CPTM receives data output from the demultiplexer DEM as a tap coefficient selection pattern PTD and compares the standby pattern PTA and the tap coefficient selection pattern PTD. The pattern comparison circuit CPTM supplies a comparison result as a tap coefficient generation enable signal PTE to the tap coefficient generation circuit TPG. That is, matching/mismatching between the standby pattern PTA and the tap coefficient selection pattern PTD is transmitted to the tap coefficient generation circuit TPG by the tap coefficient generation enable signal PTE.

The tap coefficient generation circuit TPG includes an enable terminal EN and an operation of the tap coefficient generation circuit TPG is controlled according to the tap coefficient generation enable signal PTE supplied to the enable terminal EN. That is, when the tap coefficient generation enable signal PTE shows that the standby pattern PTA and the tap coefficient selection pattern PTD are matched, the tap coefficient generation circuit TPG updates (generates) the tap coefficients +TAP1-1 and −TAP1-1 and the tap coefficients +TAP1-2 and −TAP1-2, on the basis of the operation data EQVA output from the latch circuit ALE. Meanwhile, when the tap coefficient generation enable signal PTE shows that the standby pattern PTA and the tap coefficient selection pattern PTD are mismatched, the tap coefficient generation circuit TPG discards the operation data EQVA output from the latch circuit ALE and does not update (generate) the tap coefficients +TAP1-1 and −TAP1-1 and the tap coefficients +TAP1-2 and −TAP1-2. The tap coefficient generation circuit TPG operates in synchronization with the clock signal CLK3.

In the first embodiment, the tap coefficients +TAP1-1 and +TAP1-2 correspond to each other and represent the same offset values. Likewise, the tap coefficients −TAP1-1 and −TAP1-2 correspond to each other and represent the same offset values. In this embodiment, it is determined whether the tap coefficient used by the speculative equalization circuit DFE when the operation data is acquired with respect to the input data RXO(1) and the tap coefficient used by the adaptive equalization circuit AEQ when the operation data is acquired with respect to the input data RXO(1) correspond to each other and an operation of the tap coefficient generation circuit TPG is controlled according to a determination result. The determination is performed by determining whether a tap coefficient selected by the standby pattern PTA and a tap coefficient used when operation data selected by the selection signal SEL-D output from the latch circuit DL(2) is acquired correspond to each other.

That is, at the cycle d(2), the operation data stored in the latch circuit DLH1 or the operation data stored in the latch circuit DLH2 is selected by the selection signal SEL-D from the latch circuit DL(2). When the operation data is acquired, the tap coefficients +TAP1-1 and −TAP1-1 are used. If the tap coefficient used when the operation data selected by the selection signal SEL-D is acquired corresponds to the tap coefficient selected by the standby pattern PTA, the tap coefficient generation circuit TPG updates (generates) the tap coefficient, according to the tap coefficient generation enable signal PTE. Meanwhile, if the tap coefficient used when the selected operation data is acquired does not correspond to the tap coefficient selected by the standby pattern PTA, the tap coefficient generation circuit TPG discards the supplied operation data EQVA, according to the tap coefficient generation enable signal PTE.

For example, when the operation data stored in the latch circuit DLH1 is selected by the selection signal SEL-D, the tap coefficient used when the operation data is acquired becomes the tap coefficient +TAP1-1. At this time, if the tap coefficient selected by the standby pattern PTA is the tap coefficient +TAP1-2, the tap coefficient generation circuit TPG is operated by the tap coefficient generation enable signal PTE. Meanwhile, at this time, if the tap coefficient selected by the standby pattern PTA is the tap coefficient −TAP1-2, the tap coefficient generation circuit TPG is not operated by the tap coefficient generation enable signal PTE.

Likewise, when the operation data stored in the latch circuit DLH2 is selected by the selection signal SEL-D, the tap coefficient used when the operation data is acquired becomes the tap coefficient −TAP1-1. At this time, if the tap coefficient selected by the standby pattern PTA is the tap coefficient −TAP1-2, the tap coefficient generation circuit TPG is operated by the tap coefficient generation enable signal PTE. Meanwhile, at this time, if the tap coefficient selected by the standby pattern PTA is the tap coefficient +TAP1-2, the tap coefficient generation circuit TPG is not operated by the tap coefficient generation enable signal PTE.

In this embodiment, the logical value of the selection signal SEL-D and the tap coefficient correspond to each other. That is, the logical value "1" of the selection signal SEL-D corresponds to the first input terminal I1 of the selector DSEL and corresponds to the tap coefficient storage circuit DTC1. As a result, the logical value "1" of the selection signal SEL-D corresponds to the tap coefficient +TAP1-1 stored in the tap coefficient storage circuit DTC1. In addition, the logical value "0" of the selection signal SEL-D corresponds to the second input terminal I2 of the selector DSEL and corresponds to the tap coefficient storage circuit DTC2. As a result, the logical value "0" of the selection signal SEL-D corresponds to the tap coefficient −TAP1-1 stored in the tap coefficient storage circuit DTC2.

In addition, the logical value of the standby pattern PTA and the tap coefficient correspond to each other. That is, the logical value "1" of the standby pattern PTA corresponds to the first input terminal I1 of the selector ASEL and corresponds to the tap coefficient storage circuit ATC1. As a result, the logical value "1" of the standby pattern PTA corresponds to the tap coefficient +TAP1-2 stored in the tap coefficient storage circuit ATC1. In addition, the logical value "0" of the standby pattern PTA corresponds to the second input terminal I2 of the selector ASEL and corresponds to the tap coefficient storage circuit ATC2. As a result, the logical value "0" of the standby pattern PTA corresponds to the tap coefficient −TAP1-2 stored in the tap coefficient storage circuit ATC2.

For this reason, the logical value of the standby pattern PTA and the logical value of the selection signal SEL-D are compared by the pattern comparison circuit CPTM. Thereby, as described above, it is determined whether the tap coefficient used when the operation data selected by the selection signal SEL-D is acquired corresponds to the tap coefficient selected by the standby pattern PTA and an operation of the tap coefficient generation circuit TPG can be controlled according to a determination result.

In the first embodiment, as described in FIG. 1, the frequency of the clock signal CLK2 is lower than the frequency of the clock signal CLK1. To determine whether the tap coefficients used when the operation data are acquired with respect to the same input data RXO(1) correspond to each other between the speculative equalization circuit DFE and the adaptive equalization circuit AEQ, it is necessary to delay the selection signal SEL-D output from the latch circuit DL(2). In the first embodiment, the three latch circuits DL(3) to DL(5) connected in series and the demultiplexer DEM are used to match timing with the logical value of the standby pattern PTA by delaying the selection signal SEL-D. That is, timings to compare the logical value of the selection signal SEL-D and the logical value of the standby pattern PTA are adjusted by a delay time needed to shift each of the three latch circuits DL(3) to DL(5) and a delay time of the demultiplexer DEM. The logical value of the selection signal SEL-D is output as the data RRS(1) obtained by equalizing the input data RXO(1).

In the first embodiment, the timings are adjusted using the three latch circuits and the demultiplexer DEM. However, the present invention is not limited thereto. For example, the demultiplexer DEM may not be provided.

According to the first embodiment, when the tap coefficient used for the operation in the speculative equalization circuit DFE with respect to the input data RXO(1) and the tap coefficient used for the operation in the adaptive equalization circuit AEQ with respect to the input data RXO(1) correspond to each other, the tap coefficient generation circuit TPG updates (generates) the tap coefficients, on the basis of the operation data EQVA. When the tap coefficients do not correspond to each other, the tap coefficient generation circuit TPG discards the operation data EQVA. That is, in the first embodiment, when the direction (the + direction and the − direction) of the tap coefficient used for the operation in the adaptive equalization circuit AEQ is matched with the direction of the tap coefficient used for the operation in the speculative equalization circuit DFE, the tap coefficients are updated on the basis of the operation data EQVA and when the directions are mismatched, the operation data EQVA is discarded. As a result, the tap coefficients can be appropriately updated and the number of operation circuits in the adaptive equalization circuit AEQ can be reduced.

The tap coefficients +TAP1-1, −TAP1-1, +TAP1-2, and −TAP1-2 updated by the tap coefficient generation circuit TPG are supplied to the tap coefficient storage circuits DTC1, DTC2, ATC1, and ATC2, are stored in the tap coefficient storage circuits, and are used for an operation for acquiring next operation data in the speculative equalization circuit DFE and the adaptive equalization circuit.

The frequency of the clock signal CLK2 to operate the latch circuit ALE configuring the adaptive equalization circuit AEQ is lower than the frequency of the clock signal CLK1 to operate the latch circuits DL(1) to DL(5) configuring the speculative equalization circuit DFE. As a result, the latch circuit ALE can suppress the consumption power from increasing. When mismatching is shown by the tap coefficient generation enable signal PTE, the tap coefficient generation circuit TPG is not operated. Therefore, the tap coefficient generation circuit TPG can suppress the consumption power from increasing.

When the tap coefficient generation circuit TPG is not operated by the tap coefficient generation enable signal PTE, the tap coefficients are not updated. In addition, the frequency of the clock signal CLK2 to operate the latch circuit ALE is low. As a result, it is thought that it takes time to converge the tap coefficients generated by the adaptive equalization circuit AEQ. In other words, it is thought that it takes time to converge values of the tap coefficients +TAP1-1 and −TAP1-1 used when the operation data is acquired in the speculative equalization circuit DFE. However, in the information communication apparatus 5000 (refer to FIG. 5), there is a training period before an operation of the information communication apparatus starts and transfer of the data starts. For this reason, in the training period, the values of the tap coefficients +TAP1-1 and −TAP1-1 acquired in the adaptive equalization circuit AEQ can be converged.

In addition, it is thought that loss of the transmission lines DLL(1) to DLL(i), an output characteristic of the transmission side LSI, and a characteristic of the reception amplifier change due to a change in environmental temperature, when the information communication apparatus 5000 operates. However, this change is gradual temporally. For this reason, as described above, even when it takes time to converge the tap coefficients generated by the adaptive equalization circuit AEQ, the tap coefficients can be converged according to the change in the loss or the characteristic.

Second Embodiment

Figure 2:
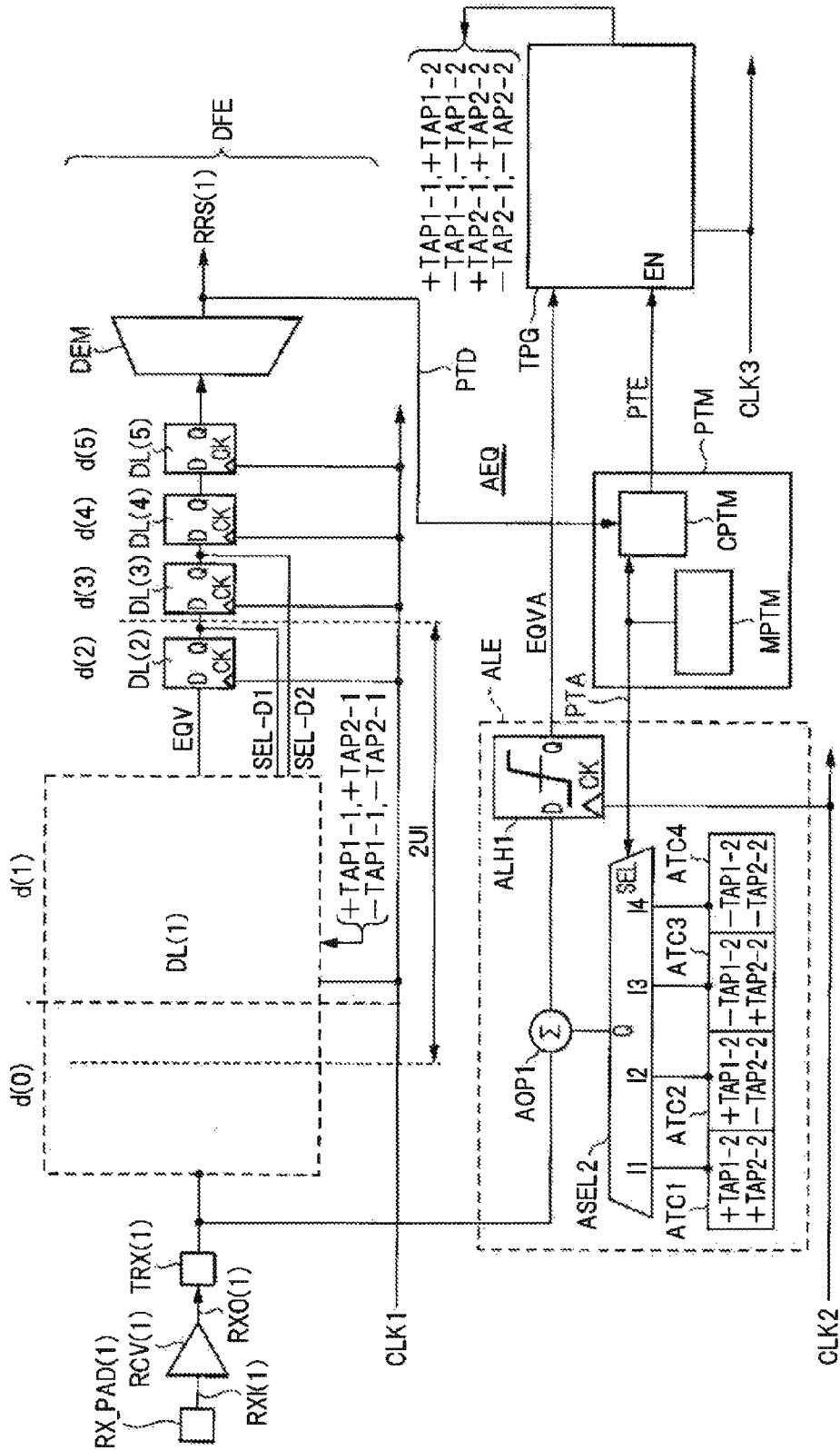
FIG. 2 is a block diagram illustrating a configuration of an adaptive equalizer according to a second embodiment.
Figure 3:
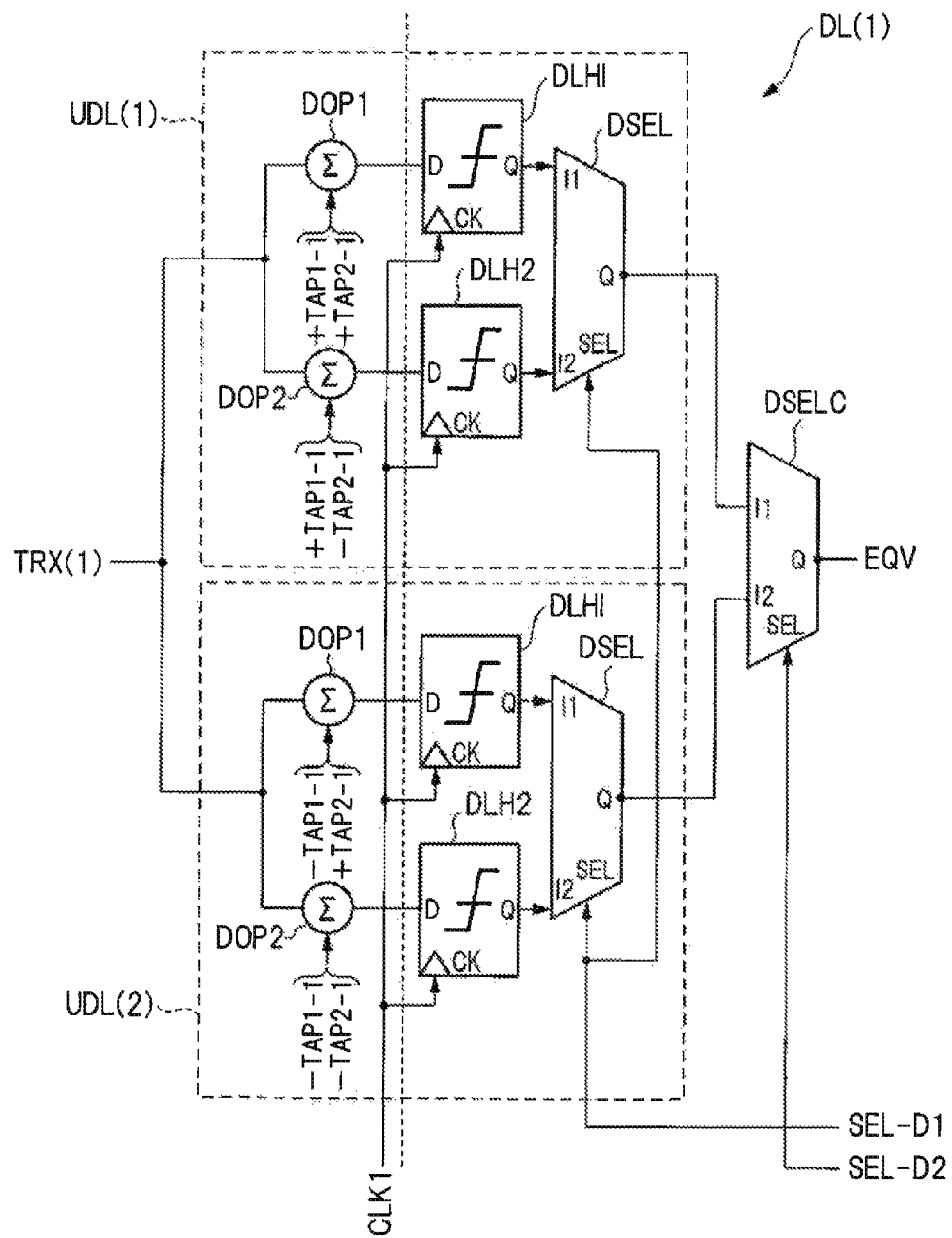
FIG. 3 is a block diagram illustrating a configuration of a latch circuit according to the second embodiment.

FIG. 2 is a block diagram illustrating a configuration of an adaptive equalizer EQ according to a second embodiment. In FIG. 2, a configuration corresponding to one channel is illustrated. The remaining channels have the same configuration as the configuration illustrated in FIG. 2. Because FIG. 2 is similar to FIG. 1, a different portion is mainly described herein. In addition, a latch circuit DL(1) provided in a speculative equalization circuit DFE is shown by a circuit block in FIG. 2 to simplify the drawing and a detailed configuration of the latch circuit DL(1) is illustrated in FIG. 3.

The adaptive equalizer according to the first embodiment and the adaptive equalizer according to the second embodiment are different from each other in that a speculative equalization circuit of one tap coefficient is used in the first embodiment and a speculative equalization circuit of two tap coefficients is used in the second embodiment, as a speculative equalization circuit used in the adaptive equalizer. Here, one tap coefficient means one set of tap coefficients and the two tap coefficients mean two sets of tap coefficients. A set of tap coefficients represent the same offset values and includes a tap coefficient showing an offset of a + direction with respect to a reference and a tap coefficient showing an offset of a − direction with respect to the reference.

In the first embodiment, tap coefficients +TAP1-1 and −TAP1-1 are configured as a set and are supplied to the latch circuit DL(1) of the speculative equalization circuit. In the latch circuit DL(1), the tap coefficient +TAP1-1 of the + direction and the tap coefficient −TAP1-1 of the − direction are operated with respect to input data RXO(1), two operation data are acquired speculatively, and the appropriate operation data is selected from the acquired two operation data. In addition, in the adaptive equalization circuit AEQ, a tap coefficient +TAP1-2 corresponding to the tap coefficient +TAP1-1 and a tap coefficient −TAP1-2 corresponding to the tap coefficient −TAP1-1 are used. Because the tap coefficients +TAP1-2 and −TAP1-2 represent the same offset values and have different directions with respect to the reference, the tap coefficients +TAP1-2 and −TAP1-2 can be regarded as a set of tap coefficients.

Meanwhile, in the second embodiment, two sets of tap coefficients are used in the speculative equalization circuit DFE. Likewise, two sets of tap coefficients are used in the adaptive equalization circuit AEQ. Here, the two sets of tap coefficients used in the speculative equalization circuit DFE are described as +TAP1-1, −TAP1-1, +TAP2-1, and −TAP2-1 and the two sets of tap coefficients used in the adaptive equalization circuit AEQ are described as +TAP1-2, −TAP1-2, +TAP2-2, and −TAP2-2.

The tap coefficient +TAP1-1 corresponds to the tap coefficient +TAP1-2 and the tap coefficient −TAP1-1 corresponds to the tap coefficient −TAP1-2. Likewise, the tap coefficient +TAP2-1 corresponds to the tap coefficient +TAP2-2 and the tap coefficient −TAP2-1 corresponds to the tap coefficient −TAP2-2. Here, the tap coefficient +TAP1-1 (+TAP1-2) and the tap coefficient −TAP1-1 (−TAP1-2) represent the same offset values and show an offset of a + direction and an offset of a − direction, respectively. Likewise, the tap coefficient +TAP2-1 (+TAP2-2) and the tap coefficient −TAP2-1 (−TAP2-2) represent the same offset values and show an offset of a + direction and an offset of a − direction, respectively. The offset values represented by the tap coefficients +TAP1-1 and −TAP1-1 (+TAP1-2 and −TAP1-2) are different from the offset values represented by the tap coefficients +TAP2-1 and −TAP2-1 (+TAP2-2 and −TAP2-2).

Next, the adaptive equalizer EQ according to the second embodiment will be described using FIGS. 2 and 3.

<Speculative Equalization Circuit>

Similar to the first embodiment, the speculative equalization circuit DFE includes latch circuits DL(1) to DL(5) and a demultiplexer DEM, as illustrated in FIG. 2. In the latch circuit DL(1), an operation is executed between input data RXO(1) supplied to a terminal TRX(1) and each of the tap coefficients +TAP1-1, +TAP2-1, −TAP1-1, and −TAP2-1 and operation data selected from four operation data acquired by the operation by selection signals SEL-D1 and SEL-D2 are sequentially shifted to the latch circuits DL(2) to DL(5) and are supplied to the demultiplexer DEM. In the demultiplexer DEM, the operation data supplied in time series is output as output data RRS(1).

The operation data supplied in time series is converted into parallel operation data by the demultiplexer DEM and the converted parallel operation data is supplied as a tap coefficient selection pattern PTD to a pattern match determination circuit PTM. Although not limited in particular, in the second embodiment, the operation data supplied in times series is converted into the parallel operation data of the two bits by the demultiplexer DEM and is output as the tap coefficient selection pattern PTD.

The operation data output from the latch circuit DL(2) is used as the selection signal SEL-D1 and the operation data output from the latch circuit DL(3) is used as the selection signal SEL-D2. Even in the second embodiment, similar to the first embodiment, a frequency of a clock signal CLK1 supplied to the latch circuits DL(1) to DL(5) becomes higher than a frequency of a clock signal CLK2 supplied to a latch circuit ALE. For this reason, similar to the first embodiment, the latch circuits DL(4) and DL(5) are provided to match timings of a standby pattern PTA generated by a standby pattern generation circuit MPTM and the tap coefficient selection pattern PTD, such that patterns can be compared in a pattern comparison circuit CPTM.

<<Latch Circuit DL(1)>>

Next, the latch circuit DL(1) will be described using FIG. 3. The latch circuit DL(1) includes two unit latch circuits UDL(1) and UDL(2) and a selector DSELC. The unit latch circuits UDL(1) and UDL(2) have the same configuration and the configuration of each of the unit latch circuits UDL(1) and UDL(2) is the same as the configuration of the latch circuit DL(1) illustrated in FIG. 1. In FIG. 3, tap coefficient storage circuits DTC1 and DTC2 to store the tap coefficients are omitted to simplify the drawing.

An operation circuit DOP1 of the unit latch circuit UDL (1) executes an operation between the tap coefficients +TAP1-1 and +TAP2-1 stored in the tap coefficient storage circuit DTC1 not illustrated in the drawings and the input data RXO(1) supplied to the terminal TRX(1) and supplies the acquired operation data to a latch circuit DLH1. In addition, an operation circuit DOP2 of the unit latch circuit UDL(1) executes an operation between the tap coefficients +TAP1-1 and −TAP2-1 stored in the tap coefficient storage circuit DTC2 not illustrated in the drawings and the input data RXO(1) supplied to the terminal TRX(1) and supplies the acquired operation data to a latch circuit DLH2.

The latch circuits DLH1 and DLH2 in the unit latch circuit UDL(1) takes the supplied operation data in synchronization with rising of the clock signal CLK1 and holds the operation data. The operation data held in the latch circuits DLH1 and DLH2 are supplied to the selector DSEL. The selector DSEL selects the operation data from the latch circuit DLH1 or DLH2 by the selection signal SEL-D1 and outputs the operation data.

An operation circuit DOP1 of the unit latch circuit UDL (2) executes an operation between the tap coefficients −TAP1-1 and +TAP2-1 stored in the tap coefficient storage circuit DTC1 not illustrated in the drawings and the input data RXO(1) supplied to the terminal TRX(1) and supplies the acquired operation data to the latch circuit DLH1. In addition, an operation circuit DOP2 of the unit latch circuit UDL(2) executes an operation between the tap coefficients −TAP1-1 and −TAP2-1 stored in the tap coefficient storage circuit DTC2 not illustrated in the drawings and the input data RXO(1) supplied to the terminal TRX(1) and supplies the acquired operation data to the latch circuit DLH2.

The latch circuits DLH1 and DLH2 in the unit latch circuit UDL(2) take the supplied operation data in synchronization with rising of the clock signal CLK1 and hold the operation data. The operation data held in the latch circuits DLH1 and DLH2 are supplied to the selector DSEL. The selector DSEL selects the operation data from the latch circuit DLH1 or DLH2 by the selection signal SEL-D1 and outputs the operation data.

The four offset values including the polarities of the + direction and the − direction with respect to the reference are represented by a combination of the two sets of tap coefficients +TAP1-1 (−TAP1-1) and +TAP2-1 (−TAP2-1). In the second embodiment, the four offset values are added to the input data RXO(1) by the four operation circuits DOP1 and DOP2 in the unit latch circuits UDL(1) and UDL(2).

That is, the offset values (including the polarities of the + direction and the − direction) represented by a combination of the tap coefficients +TAP1-1 and +TAP2-1 are added to the input data RXO(1) by the operation circuit DOP1 in the unit latch circuit UDL(1). In addition, the offset values (including the polarities of the + direction and the − direction) represented by a combination of the tap coefficients +TAP1-1 and −TAP2-1 are added to the input data RXO(1) by the operation circuit DOP2 in the unit latch circuit UDL(1). Likewise, the offset values (including the polarities of the + direction and the − direction) represented by a combination of the tap coefficients −TAP1-1 and +TAP2-1 are added to the input data RXO(1) by the operation circuit DOP1 in the unit latch circuit UDL(2). In addition, the offset values (including the polarities of the + direction and the − direction) represented by a combination of the tap coefficients −TAP1-1 and −TAP2-1 are added to the input data RXO(1) by the operation circuit DOP2 in the unit latch circuit UDL(2).

In this way, the four operation data to which the offset values are added are taken in the latch circuits DLH1 and DLH2 in the unit latch circuits UDL(1) and UDL(2) in synchronization with the clock signal CLK1.

In each of the unit latch circuits UDL(1) and UDL(2), when the selection signal SEL-D1 has a logical value of "1", the selector DSEL selects the operation data supplied to the first input terminal I1 and outputs the operation data from an output terminal Q and when the selection signal SEL-D1 has a logical value of "0", the selector DSEL selects the operation data supplied to the second input terminal I2 and outputs the operation data from the output terminal Q.

The selector DSELC receives the operation data from the unit latch circuit UDL(1) and the operation data from the unit latch circuit UDL(2), selects one operation data from the received operation data according to a logical value of the selection signal SEL-D2, and outputs the operation data as operation data EQV (refer to FIG. 2). For example, when the selection signal SEL-D2 has a logical value of "1", the selector DSELC selects the operation data supplied to the first input terminal I1 and outputs the operation data from the output terminal Q and when the selection signal SEL-D2 has a logical value of "0", the selector DSELC selects the operation data supplied to the second input terminal I2 and outputs the operation data from the output terminal Q.

The logical value of the selection signal SEL-D1 is a logical value of the operation data output from the latch circuit DL(2) and the logical value of the selection signal SEL-D2 is a logical value of the operation data output from the latch circuit DL(3). For this reason, one of the four operation data is selected by the two selectors DSEL and DSELC according to a logical value of the input data RXO(1) input in the past and is output as the operation data EQV. As a result, deterioration by inter-symbol interference is reduced.

<Adaptive Equalization Circuit>

Returning to FIG. 2, the configuration of the adaptive equalization circuit AEQ will be described. Similar to the first embodiment, even in the second embodiment, the adaptive equalization circuit AEQ includes a latch circuit ALE, a pattern match determination circuit PTM, and a tap coefficient generation circuit TPG.

Because the tap coefficient generation circuit TPG is the same as that in the first embodiment, description thereof is omitted. The pattern match determination circuit PTM includes a standby pattern generation circuit MPTM and a pattern comparison circuit CPTM, similar to the pattern match determination circuit described in the first embodiment. In the second embodiment, the standby pattern generation circuit MPTM generates a standby pattern PTA configured using logical values of two bits in time series. The generated standby pattern PTA is supplied to the pattern comparison circuit CPTM and the latch circuit ALE.

The pattern comparison circuit CPTM compares the tap coefficient selection pattern PTD and the standby pattern. Each of the tap coefficient selection pattern PTD and the standby pattern PTA is a pattern configured using logical values of two bits. When the tap coefficient selection pattern PTD and the standby pattern PTA are matched by comparison, similar to the first embodiment, a tap coefficient generation enable signal PTE showing matching is generated by the pattern comparison circuit CPTM and is supplied to an enable terminal EN of the tap coefficient generation circuit TPG. Meanwhile, when the tap coefficient selection pattern PTD and the standby pattern PTA are mismatched, a tap coefficient generation enable signal PTE showing mismatching is generated by the pattern comparison circuit CPTM and is supplied to the enable terminal EN of the tap coefficient generation circuit TPG. Similar to the first embodiment, an operation of the tap coefficient generation circuit TPG is controlled by the tap coefficient generation enable signal PTE.

The latch circuit ALE includes an operation circuit AOP1, a latch circuit ALH1, a selector ASEL2, and tap coefficient storage circuits ATC1 to ATC4. The operation circuit AOP1 executes an operation between a tap coefficient selected by the selector ASEL2 and the input data RXO(1) supplied to the terminal TRX(1). Operation data acquired by the operation is supplied to an input terminal D of the latch circuit ALH1. The latch circuit ALH1 takes the operation data supplied to the input terminal D in synchronization with rising of a clock signal CLK2 supplied to a clock terminal CK and holds the operation data. The held operation data is supplied as the operation data EQVA to the tap coefficient generation circuit TPG.

The tap coefficient storage circuit ATC1 is connected to the first input terminal I1 of the selector ASEL2 and stores the tap coefficients +TAP1-2 and +TAP2-2 and the tap coefficient storage circuit ATC2 is connected to the second input terminal I2 of the selector ASEL2 and stores the tap coefficients +TAP1-2 and −TAP2-2. Likewise, the tap coefficient storage circuit ATC3 is connected to a third input terminal I3 of the selector ASEL2 and stores the tap coefficients −TAP1-2 and +TAP2-2 and the tap coefficient storage circuit ATC4 is connected to a fourth input terminal I4 of the selector ASEL2 and stores the tap coefficients −TAP1-2 and −TAP2-2.

The selector ASEL2 selects one of the input terminals I1 to I4 according to the standby pattern PTA supplied to the selection terminal SEL and outputs the tap coefficient stored in the tap coefficient storage circuit connected to the selected input terminal from the output terminal Q. In the second embodiment, each of the standby pattern PTA and the tap coefficient selection pattern PTD becomes a pattern configured using logical values of two bits. For this reason, among the input terminals I1 to I4, the input terminal designated by a combination of the logical values of the two bits configuring the standby pattern PTA is selected.

In the first embodiment, the tap coefficient selected by the tap coefficient selection pattern PTD and the tap coefficient selected by the standby pattern PTA correspond to each other. That is, when the tap coefficient selection pattern PTD and the standby pattern PTA are patterns of the same logical values, the tap coefficients corresponding to each other are selected.

Specifically, in FIGS. 2 and 3, the operation data output from the latch circuits DL(2) and DL(3) become the selection signals SEL-D1 and SEL-D2 to select the operation data obtained by the operation between the input data RXO(1) and the tap coefficients. The selection signals SEL-D1 and SEL-D2 are converted in parallel in the demultiplexer DEM and become the tap coefficient selection pattern PTD. Because the selection signals SEL-D1 and SEL-D2 are used to acquire one operation data from the four operation data acquired by the operation between the input data RXO(1) and the tap coefficients, the selection signals SEL-D1 and SEL-D2 can be regarded as selection signals to designate the tap coefficients used when the operation data is acquired. In this case, the tap coefficient selection pattern PTD is regarded as a pattern showing the selected tap coefficient.

In the first embodiment, when the tap coefficient selection pattern PTD is a pattern to select the latch circuit DLH1 in the unit latch circuit UDL(1), that is, a pattern to select the tap coefficients +TAP1-1 and +TAP2-1, the selector ASEL2 selects the first input terminal I1, by the standby pattern PTA having the same logical values as the logical values of the tap coefficient selection pattern PTD. As a result, the tap coefficients +TAP1-2 and +TAP2-2 corresponding to the tap coefficients +TAP1-1 and +TAP2-1 are selected. In addition, when the tap coefficient selection pattern PTD is a pattern to select the latch circuit DLH2 in the unit latch circuit UDL(1), that is, a pattern to select the tap coefficients +TAP1-1 and −TAP2-1, the selector ASEL2 selects the second input terminal I2, by the standby pattern PTA having the same logical values as the logical values of the tap coefficient selection pattern PTD. As a result, the tap coefficients +TAP1-2 and −TAP2-2 corresponding to the tap coefficients +TAP1-1 and −TAP2-1 are selected.

When the tap coefficient selection pattern PTD is a pattern to select the latch circuit DLH1 in the unit latch circuit UDL(2), that is, a pattern to select the tap coefficients −TAP1-1 and +TAP2-1, the selector ASEL2 selects the third input terminal I3, by the standby pattern PTA having the same logical values as the logical values of the tap coefficient selection pattern PTD. As a result, the tap coefficients −TAP1-2 and +TAP2-2 corresponding to the tap coefficients −TAP1-1 and +TAP2-1 are selected. In addition, when the tap coefficient selection pattern PTD is a pattern to select the latch circuit DLH2 in the unit latch circuit UDL(2), that is, a pattern to select the tap coefficients −TAP1-1 and −TAP2-1, the selector ASEL2 selects the fourth input terminal I4, by the standby pattern PTA having the same logical values as the logical values of the tap coefficient selection pattern PTD. As a result, the tap coefficients −TAP1-2 and −TAP2-2 corresponding to the tap coefficients −TAP1-1 and −TAP2-1 are selected.

The input terminal of the selector ASEL2 is selected by the standby pattern generated by the standby pattern generation circuit MPTM. The tap coefficient stored in the tap coefficient storage circuit connected to the selected input terminal is supplied to the operation circuit AOP1. For example, the first input terminal I1 is selected and the operation is executed between the input data RXO(1) and the tap coefficients +TAP1-2 and +TAP2-2. As a result, the offset values (including the polarities of the + direction and the − direction) represented by the tap coefficients +TAP1-2 and +TAP2-2 are added to the input data RXO(1). The operation data to which the offset values have been added is taken in the latch circuit ALH1 and is held therein. At this time, because the second to fourth input terminals I2 to I4 of the selector ASEL2 are not selected, the operation between the tap coefficients supplied to these input terminals and the input data RXO(1) is not executed.

The operation is executed between the same input data RXO(1) and the tap coefficients by the operation circuits DOP1 and DOP2, in each of the unit latch circuits UDL(1) and UDL(2) in the latch circuit DL(1). By the operation, four operation data are acquired with respect to the input data RXO(1). The acquired four operation data are selected by the selection signals SEL-D1 and SEL-D2 based on the operation data of the past input data. The selection signals SEL-D1 and SEL-D2 are output as the tap coefficient selection pattern PTD from the demultiplexer DEM, after a predetermined time.

Because the standby pattern generation circuit MPTM generates the standby pattern PTA to select the first input terminal I1, the pattern comparison circuit CPTM compares the standby pattern PTA to select the first input terminal I1 and the tap coefficient selection pattern PTD from the demultiplexer DEM. If the tap coefficient selection pattern PTD output from the demultiplexer DEM with respect to the same input data RXO(1) is a pattern to designate the latch circuit DLH1 of the unit latch circuit UDL(1) in the latch circuit DL(1), that is, the tap coefficients +TAP1-1 and +TAP2-1, the pattern comparison circuit CPTM outputs the tap coefficient generation enable signal PTE showing matching.

Meanwhile, at this time, if the tap coefficient selection pattern PTD output from the demultiplexer DEM is a pattern to designate the latch circuit DLH2 of the unit latch circuit UDL(1) or the latch circuits DLH1 and DLH2 of the unit latch circuit UDL(2), that is, the tap coefficients +TAP1-1 and −TAP2-1, the tap coefficients −TAP1-1 and +TAP2-1, or the tap coefficients −TAP1-1 and −TAP2-1, the pattern comparison circuit CPTM outputs the tap coefficient generation enable signal PTE showing mismatching.

That is, when the tap coefficient used for the operation in the latch circuit DL(1) and the tap coefficient used for the operation in the latch circuit ALE with respect to the same input data RXO(1) correspond to each other, the tap coefficient generation circuit TPG is operated by the tap coefficient generation enable signal PTE. Meanwhile, when the tap coefficient used for the operation in the latch circuit DL(1) and the tap coefficient used for the operation in the latch circuit ALE with respect to the same input data RXO(1) do not correspond to each other, the tap coefficient generation circuit TPG is not operated by the tap coefficient generation enable signal PTE.

Thereby, when the tap coefficient generation circuit TPG operates, the operation data EQVA to which the offset value represented by the tap coefficient corresponding to the tap coefficient used by the speculative equalization circuit DFE at the time of equalization has been added is supplied to the tap coefficient generation circuit TPG. As a result, the tap coefficients can be appropriately updated. Meanwhile, when the tap coefficient used by the speculative equalization circuit DFE at the time of the equalization and the tap coefficient used at the time of the operation in the latch circuit ALE do not correspond to each other, the tap coefficient generation circuit TPG does not operate. For this reason, the operation data EQVA is discarded. In this case, the discarded operation data is operation data that is acquired by an operation with the tap coefficient not corresponding to the tap coefficient used by the speculative equalization circuit DFE, with respect to the same input data RXO(1). The operation data EQVA is discarded, so that the tap coefficients can be prevented from being updated undesirably.

The example of the case in which the first input terminal I1 is selected by the standby pattern PTA has been described. However, the present invention is applicable to the case in which the other input terminals I2 to I4 are selected by the standby pattern PTA.

The tap coefficients updated (generated) by the tap coefficient generation circuit TPG are supplied to the tap coefficient storage circuits in the latch circuit DL(1) and the latch circuit ALE and are stored therein.

In the second embodiment, the pattern match determination circuit PTM operates in synchronization with the clock signal CLK2. For example, the standby pattern generation circuit MPTP generates the standby pattern PTA in synchronization with the clock signal CLK2. Then, the pattern comparison circuit CPTM compares the generated standby pattern PTA and the tap coefficient selection pattern PTD and generates the tap coefficient generation enable signal PTE.

In the second embodiment, the example of the adaptive equalizer EQ using the two sets of tap coefficients has been described. However, two or more sets of tap coefficients may be used. Even if the number of sets of tap coefficients increases, the number of operation circuits in the latch circuit ALE can be set to one and the number of operation circuits can be suppressed from increasing. Therefore, a load capacity connected to an output of a reception amplifier can be suppressed from increasing. In addition, consumption power can be suppressed from increasing.

Third Embodiment

Figure 4:
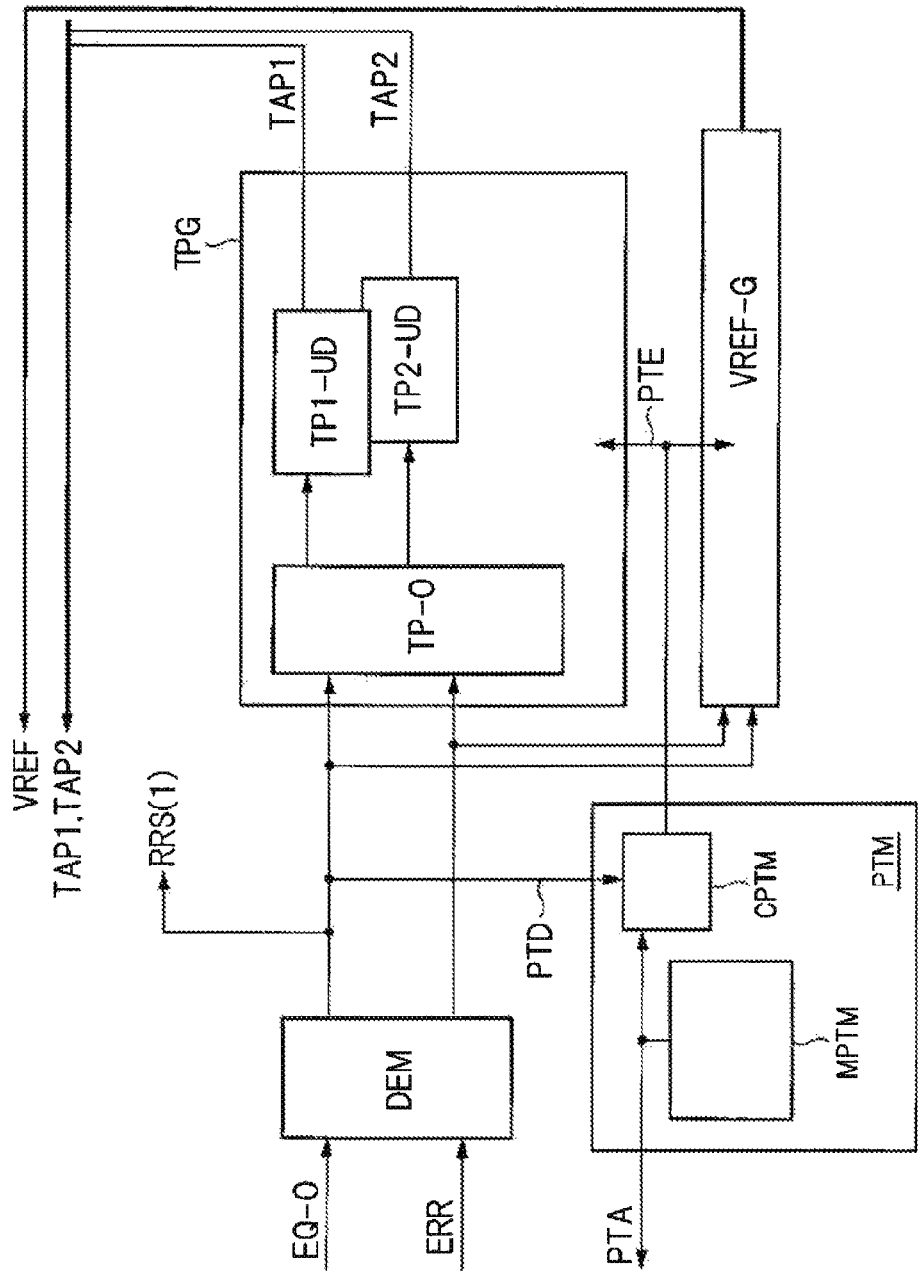
FIG. 4 is a block diagram illustrating a configuration of an adaptive equalizer according to a third embodiment.

FIG. 4 is a block diagram illustrating a configuration of an adaptive equalizer EQ according to a third embodiment. In FIG. 4, a configuration to generate tap coefficients is illustrated. In FIG. 4, DEM, PTM, and TPG show a demultiplexer, a pattern match determination circuit, and a tap coefficient generation circuit described in FIGS. 1 and 2, respectively. In addition, in FIG. 4, VREF-G shows a reference generation circuit.

As described in the second embodiment, for example, the pattern match determination circuit PTM includes a standby pattern generation circuit MPTM and a pattern comparison circuit CPTM. The standby pattern generation circuit MPTM generates a standby pattern PTA and the pattern comparison circuit CPTM compares the standby pattern PTA and a tap coefficient selection pattern PTD and generates a tap coefficient generation enable signal PTE showing matching/mismatching.

In the fourth embodiment, although not limited in particular, operation data from a latch circuit DL (refer to FIG. 2) is shown as operation data EQ-O and is supplied to the demultiplexer DEM. In addition, an error signal ERR to be described later is supplied to the demultiplexer DEM. Each operation data is converted in parallel by the demultiplexer DEM and is supplied to the tap coefficient generation circuit TPG and the reference generation circuit VREF-G. In addition, the operation data converted in parallel is supplied as the tap coefficient selection pattern PTD to the pattern match determination circuit PTM and is output as output data RRS(1). The error signal ERR is also supplied to the tap coefficient generation circuit TPG and the reference generation circuit VREF-G via the demultiplexer DEM.

The tap coefficient generation circuit TPG includes a tap coefficient operation circuit TP-O to operate tap coefficients, on the basis of the supplied operation data and error signal ERR, and a plurality of tap coefficient up-down counters. In FIG. 4, only the tap coefficient up-down counters to output two sets of tap coefficients TAP1 and TAP2 illustrated in FIG. 2 are shown as TP1-UD and TP2-UD.

Operations of the tap coefficient operation circuit TP-O and the tap coefficient up-down counters TP1-UD and TP2-UD are controlled by a tap coefficient generation enable signal PTE. That is, when the tap coefficient generation enable signal PTE shows matching, the tap coefficient operation circuit TP-O and the tap coefficient up-down counters TP1-UD and TP2-UD operate and when the tap coefficient generation enable signal PTE shows mismatching, the tap coefficient operation circuit TP-O and the tap coefficient up-down counters TP1-UD and TP2-UD do not operate.

When the tap coefficient generation enable signal PTE shows matching, the tap coefficient operation circuit TP-O outputs a count control signal to command count up or count down to the tap coefficient up-down counters TP1-UD and TP2-UD, on the basis of the supplied operation data and error signal ERR. If the count up is commanded by the count control signal, the tap coefficient up-down counters TP1-UD and TP2-UD perform the count up and update the tap coefficients TAP1 and TAP2. In addition, if the count down is commanded by the count control signal, the tap coefficient up-down counters TP1-UD and TP2-UD perform the count down and update tap coefficients TP1 and TP2. Here, the tap coefficient TP1 includes tap coefficients +TAP1-1, −TAP1-1, +TAP1-2, and −TAP1-2 illustrated in FIG. 2 and the tap coefficient TP2 includes tap coefficients +TAP2-1, −TAP2-1, +TAP2-2, and −TAP2-2 illustrated in FIG. 2. The tap coefficients generated by the tap coefficient generation circuit TPG are supplied to the latch circuits DL(1) and ALE illustrated in FIG. 2.

Also, an operation of the reference generation circuit VREF-G is controlled by the tap coefficient generation enable signal PTE. That is, when the tap coefficient generation enable signal PTE shows matching, the reference generation circuit VREF-G generates a reference voltage VREF based on the supplied operation data and error signal ERR. Meanwhile, when the tap coefficient generation enable signal PTE shows mismatching, the reference generation circuit VREF-G does not generate the reference voltage VREF based on the supplied operation data and error signal ERR. In this case, a value of the previously generated reference voltage VREF is maintained.

The reference voltage VREF generated by the reference generation circuit VREF-G becomes a reference to operate the error signal ERR to determine an update direction of the tap coefficients.

Although not limited in particular, the reference voltage VREF from the reference generation circuit VREF-G is supplied to the latch circuit ALE. In the latch circuit ALE, operation data acquired by an operation circuit AOP1 and the reference voltage VREF are compared and the error signal ERR is generated according to a comparison result. That is, it is determined whether a value represented by the operation data with respect to the reference voltage VREF is a value of a + direction or a value of a − direction and a determination result is output as the error signal ERR. For example, when the tap coefficient operation circuit TP-O operates, the tap coefficient operation circuit TP-O performs the count down or the count up of the tap coefficient up-down counters TP1-UD and TP2-UD, according to whether the error signal ERR shows the + direction or shows the − direction.

In the third embodiment, because the reference generation circuit VREF-G to generate the reference is also controlled by the tap coefficient generation enable signal PTE, consumption power can be suppressed from increasing.

Fourth Embodiment

In the first and second embodiments, in a latch circuit ALE, tap coefficients are selected according to a standby pattern PTA and an operation is executed between the tap coefficients and input data RXO(1). It is determined thereafter whether the tap coefficients used for the operation are appropriate. That is, operation data is speculatively acquired in an adaptive equalization circuit AEQ.

For example, in an adaptive equalizer EQ of two tap coefficients described in the second embodiment, if a standby pattern PTA generated by a standby pattern generation circuit MPTM represents fixed logical values of two bits, for example, "0 and 1", operation data output from an operation circuit AOP1 in the latch circuit ALE (refer to FIG. 2) changes cyclically when viewed on a time axis. That is, it is thought that operation data is weighted toward a specific frequency component and convergence precision of tap coefficients is deteriorated.

In a fourth embodiment, the standby pattern generation circuit MPTM generates a standby pattern PTA that is not fixed and changes temporally.

In the case of the adaptive equalizer EQ of the two tap coefficients, the standby pattern generation circuit MPTM generates a standby pattern PTA in which logical values of two bits circulate like "0 and 0", "0 and 1", "1 and 0", and "1 and 1". As a result, the operation data can be prevented from being weighted toward a specific frequency component and convergence precision of tap coefficients can be improved.

In addition, in a specific situation where the tap coefficients are not converged sufficiently even if the logical values of the standby pattern PTA circulate as described above, it is thought that a tap coefficient selection pattern is not matched with a specific standby pattern and convergence of the tap coefficients gets stuck. For this reason, the pattern generation circuit MPTM is configured to change the standby pattern compulsorily, when the convergence of the tap coefficients is not updated for a predetermined time. That is, the pattern generation circuit MPTM is configured to continuously generate several kinds of standby patterns configured using combinations of specific logical values and generate patterns configured using combinations of logical values different from the combinations of the logical values of the continuous standby patterns, when a predetermined time passes. For example, when the standby patterns are continuous as "0 and 0", "0 and 1", and "1 and 0", the pattern generation circuit MPTM generates a standby pattern of "1 and 1", when the predetermined time passes.

In the second embodiment, the adaptive equalizer of the two tap coefficients has been described. However, in the case of an adaptive equalizer of three tap coefficients, the standby pattern PTA is configured using logical values of three bits. In this case, the standby pattern PTA can take any one of patterns of logical values "0, 0, and 0" to "1, 1, and 1".

In the case in which one standby pattern PTA is viewed, when a change of logical values between adjacent bits is large, a frequency of operation data is high. For example, in the case of the standby patterns PTA of logical values "0, 0, and 0", "0, 1, and 1", "1, 1, and 0", and "1, 1, and 1", a change of logical values between adjacent bits is 0 or 1 in each of the standby patterns PTA. For this reason, the frequency of the operation data when viewed on the time axis becomes relatively low. Meanwhile, in the case of the standby patterns PTA of logical values "0, 1, and 0" and "1, 0, and 1", a change of logical values between adjacent bits is 2 in each of the standby patterns PTA. For this reason, the frequency of the operation data when viewed on the time axis becomes relatively high.

For example, in an initial section of a training period, because optimization of the tap coefficients does not advance, it is thought that the standby pattern PTA of which the frequency becomes a relatively high frequency is not matched with the tap coefficient selection pattern PTD. For this reason, the standby pattern generation circuit MPTM generates the standby pattern PTA of which the frequency becomes a relatively low frequency (first frequency) and then generates the standby pattern PTA of which the frequency becomes a frequency (second frequency) higher than the first frequency, until the tap coefficients converge to a predetermined value.

For example, in the initial section of the training period, the pattern generation circuit MPTM generates patterns ("0, 0, and 0", "0, 1, and 1", "1, 1, and 0", and "1, 1, and 1") of the first frequency where a change of logical values between adjacent bits is small and then generates patterns ("0, 1, and 0" and "1, 0, and 1") of the second frequency where a change of logical values between adjacent bits is large. In this case, for example, control may be executed such that a time is measured from when the training period starts and the pattern generation circuit MPTM generates different patterns on the basis of a predetermined time. In this way, convergence precision of the tap coefficients can be improved. The three tap coefficients are exemplified. However, four or more tap coefficients may be used.

The tap coefficients +TAP1-1, −TAP1-1, +TAP2-1, and −TAP2-1 described in the embodiments can be regarded as the first tap coefficients used by the speculative equalization circuit DFE. In addition, the tap coefficients +TAP1-2, −TAP1-2, +TAP2-2, and −TAP2-2 can be regarded as the second tap coefficients used by the adaptive equalization circuit AEQ. In this case, the tap coefficients +TAP1-1 and +TAP2-1 representing the offset values of the first direction with respect to the reference can be regarded as the first direction first tap coefficients and the tap coefficients −TAP1-1 and −TAP2-1 representing the offset values of the second direction with respect to the reference can be regarded as the second direction first tap coefficients. Likewise, the tap coefficients +TAP1-2 and +TAP2-2 representing the offset values of the first direction with respect to the reference can be regarded as the first direction second tap coefficients and the tap coefficients −TAP1-2 and −TAP2-2 representing the offset values of the second direction with respect to the reference can be regarded as the second direction second tap coefficients.

In the embodiments described above, the example of the case in which the output load of the reception amplifier RCV(1) is reduced is described. However, a load reduction target is not limited to the output of the reception amplifier and may be any portion where the decision feedback equalizer and the adaptive equalizer are coupled. For example, in the case of a configuration in which the decision feedback equalizer and the adaptive equalizer are coupled to a terminal immediately after the transmission line, an input load of the terminal immediately after the transmission line becomes a load reduction target.

The present invention has been described specifically on the basis of the embodiments. However, the present invention is not limited to the embodiments and various changes can be made without departing from the scope of the present invention.

What is claimed is:

1. An adaptive equalizer comprising:
a speculative equalization circuit which operates a plurality of first tap coefficients with respect to input data and selects operation data corresponding to the input data from a plurality of operation data obtained by the operation; and
an adaptive equalization circuit which generates the plurality of first tap coefficients, on the basis of the input data, wherein
the adaptive equalization circuit includes:
an operation circuit which selects one of a plurality of second tap coefficients corresponding to the plurality of first tap coefficients and operates the selected second tap coefficient with respect to the input data; and
a tap coefficient generation circuit which generates the plurality of first tap coefficients, on the basis of operation data obtained by the operation of the operation circuit, when the second tap coefficient selected at the time of the operation in the operation circuit corresponds to the first tap coefficient used for the operation of the operation data selected in the speculative equalization circuit.

2. The adaptive equalizer according to claim 1, wherein
the speculative equalization circuit operates in synchronization with a first clock signal and the operation circuit in the adaptive equalization circuit operates in synchronization with a second clock signal of which a frequency is lower than a frequency of the first clock signal.

3. The adaptive equalizer according to claim 2, wherein
the adaptive equalization circuit includes a pattern generation circuit which generates a standby pattern to designate one of the plurality of second tap coefficients and a comparison circuit which compares a selection pattern to select the operation data in the speculative equalization circuit and the standby pattern, and
the tap coefficient generation circuit generates the plurality of first tap coefficients and the plurality of second tap coefficients, when a comparison result in the comparison circuit is determined as matching, and discards the operation data obtained by the operation in the operation circuit, when the comparison result in the comparison circuit is determined as mismatching.

4. The adaptive equalizer according to claim 3, wherein
each of the plurality of first tap coefficients and the plurality of second tap coefficients represents an offset with respect to a reference,
the plurality of first tap coefficients have a first direction first tap coefficient representing an offset of the side of a first direction with respect to the reference and a second direction first tap coefficient representing an offset of the side of a second direction opposite to the first direction with respect to the reference, and
the plurality of second tap coefficients have a first direction second tap coefficient representing an offset of the side of the first direction with respect to the reference and a second direction second tap coefficient representing an offset of the side of the second direction.

5. The adaptive equalizer according to claim 4, wherein
the adaptive equalization circuit includes a reference generation circuit which generates the reference, when the determination result in the comparison circuit is determined as matching.

6. The adaptive equalizer according to claim 3, wherein
the standby pattern is represented by a combination of a plurality of logical values, and when the pattern generation circuit generates standby patterns to be continuous temporally, the pattern generation circuit generates the standby patterns, such that combinations of logical values circulate between the continuous standby patterns.

7. The adaptive equalizer according to claim 3, wherein the standby pattern is represented by a combination of a plurality of logical values, and when the pattern generation circuit generates standby patterns to be continuous temporally, the pattern generation circuit generates a standby pattern having a combination of logical values different from combinations of logical values of the continuous standby patterns, after a predetermined time passes, when the pattern generation circuit forms the standby patterns.

8. The adaptive equalizer according to claim 3, wherein the pattern generation circuit generates a standby pattern of a first frequency and then generates a standby pattern of a second frequency higher than the first frequency.

\* \* \* \* \*

UNITED STATES PATENT AND TRADEMARK OFFICE
CERTIFICATE OF CORRECTION

PATENT NO. : 9,667,454 B1
APPLICATION NO. : 15/186791
DATED : May 30, 2017
INVENTOR(S) : Hideki Koba et al.

It is certified that error appears in the above-identified patent and that said Letters Patent is hereby corrected as shown below:

On the Title Page

Column 1, Item (30) should read:
Foreign Application Priority Data: December 17, 2015   (JP) 2015 - 245925

Signed and Sealed this
Eighth Day of May, 2018

Andrei Iancu
*Director of the United States Patent and Trademark Office*